July 24, 1962
P. KLAMP
3,045,610
SUB-FLOOR CONVEYOR SYSTEM
Filed Sept. 9, 1957
10 Sheets-Sheet 1
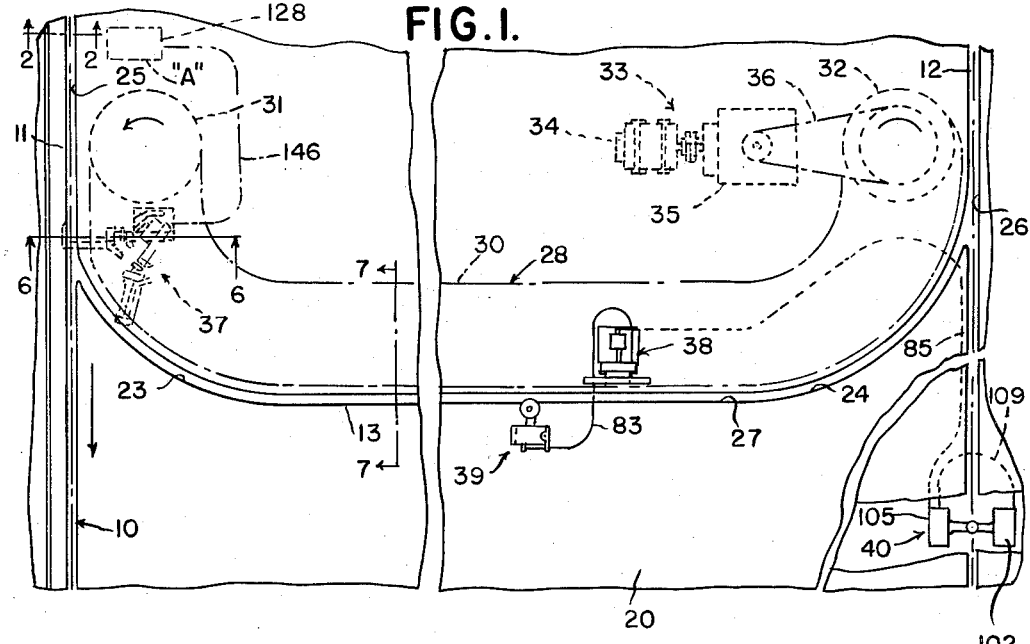
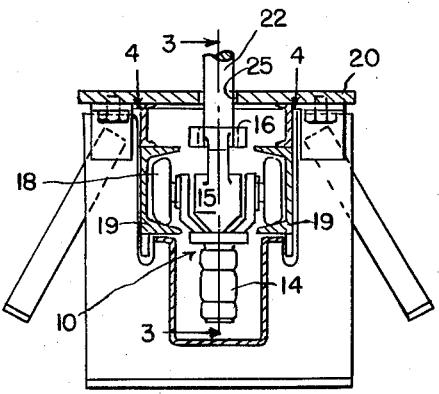
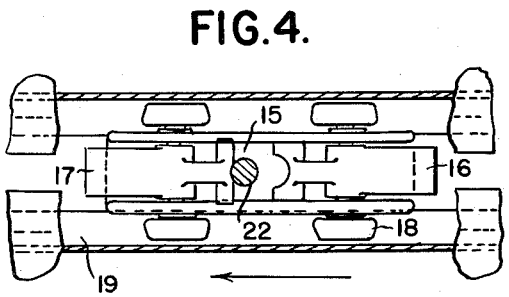
INVENTOR.
PAUL KLAMP
BY Whittemore, Hulbert &
Belknap
ATTORNEYS July 24, 1962 P. KLAMP 3,045,610
SUB-FLOOR CONVEYOR SYSTEM
Filed Sept. 9, 1957 10 Sheets-Sheet 3

INVENTOR.
PAUL KLAMP
BY *Whittemore, Hulbert*
*& Belknap*
ATTORNEYS

July 24, 1962 — P. KLAMP — 3,045,610
SUB-FLOOR CONVEYOR SYSTEM
Filed Sept. 9, 1957 — 10 Sheets-Sheet 4
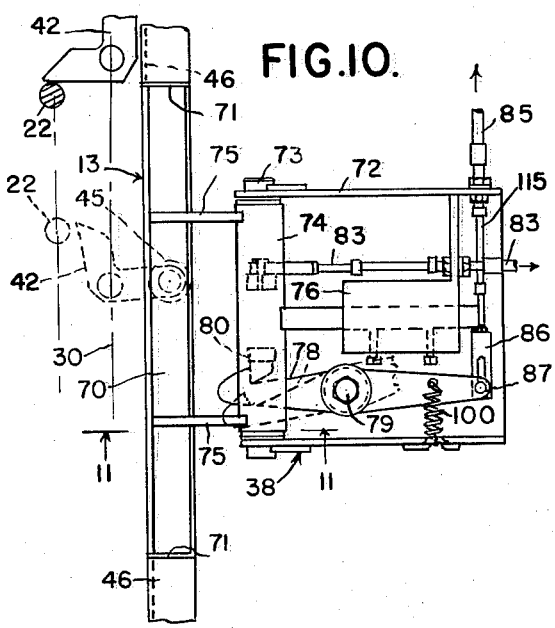
FIG.10.
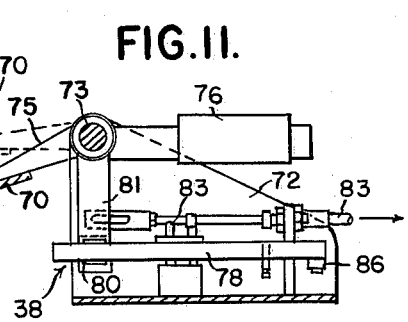
FIG.11.
FIG.17.
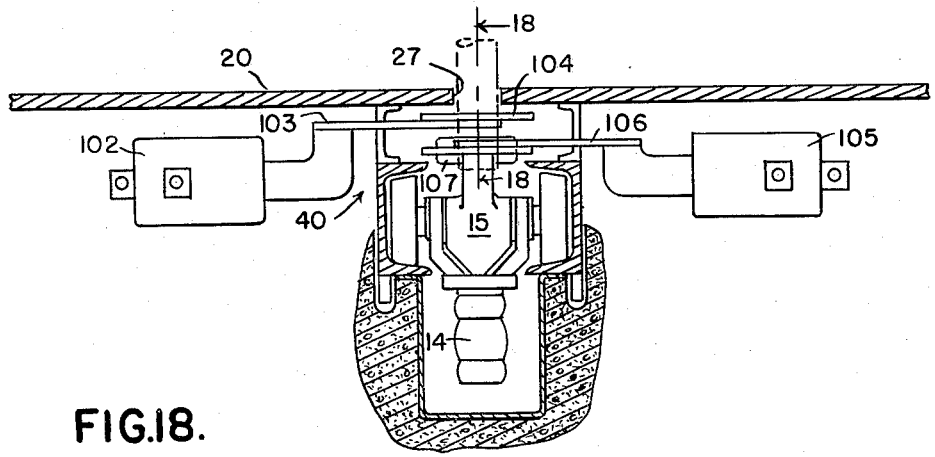
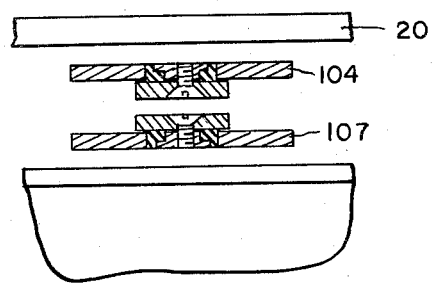
FIG.18.
INVENTOR.
PAUL KLAMP
BY Whittemore, Hulbert
Belknap
ATTORNEYS INVENTOR.
PAUL KLAMP
BY Whittemore Hulbert
Belknap
ATTORNEYS July 24, 1962  P. KLAMP  3,045,610
SUB-FLOOR CONVEYOR SYSTEM
Filed Sept. 9, 1957  10 Sheets-Sheet 6

INVENTOR.
PAUL KLAMP
BY
ATTORNEYS

July 24, 1962 P. KLAMP 3,045,610
SUB-FLOOR CONVEYOR SYSTEM
Filed Sept. 9, 1957 10 Sheets-Sheet 7

INVENTOR.
PAUL KLAMP
BY Whittemore Hulbert
Belknap
ATTORNEYS

July 24, 1962 P. KLAMP 3,045,610
SUB-FLOOR CONVEYOR SYSTEM
Filed Sept. 9, 1957 10 Sheets-Sheet 8

INVENTOR.
PAUL KLAMP
BY
ATTORNEYS

INVENTOR.
PAUL KLAMP
BY Whittemore, Hulbert
Belknap
ATTORNEYS

July 24, 1962 P. KLAMP 3,045,610
SUB-FLOOR CONVEYOR SYSTEM
Filed Sept. 9, 1957 10 Sheets-Sheet 10

INVENTOR.
PAUL KLAMP
BY
ATTORNEYS

United States Patent Office 3,045,610
Patented July 24, 1962

3,045,610
SUB-FLOOR CONVEYOR SYSTEM
Paul Klamp, St. Clair Shores, Mich., assignor to Mechanical Handling Systems, Inc., Detroit, Mich., a corporation of Michigan
Filed Sept. 9, 1957, Ser. No. 682,797
25 Claims. (Cl. 104—88)

The present invention relates to improvements in a continuously operating conveyor system for industrial, warehouse and like use. As here illustrated and described, the invention contemplates sub-floor truck tow lines for factory, warehouse, loading dock or like installations, in which it is the function of several tow chain arrangements to transport load carrying trucks in an automatically controlled fashion above the floor. Thus the trucks may be drawn above and along a main chain powered tow line and selectively through transfer or branch lines, which may also be individually chain powered, under the control of automatic sub-floor switching provisions to engage a depending tow pin on the truck for the purpose.

Provisions are also made to accumulate trucks at any desired point in the system; and though the system chosen for illustration is a simple one, involving but a single main line or track and a single branch or transfer line operating between reaches thereof, it is to be understood that the system may readily be expanded and adapted for far more complex installations. All types of switching of load bearing trucks or like units, i.e., between conveyor tracks or lines, from a live conveyor to a dead storage or like station, etc., are contemplated.

It will also be evident to those skilled in the art, as the description proceeds, that certain principles of the invention have general applicability in other conveyor equipment, for example, of the overhead type, whether fully powered or power and free.

It is an object of the invention to provide a comprehensive, automatically switching and accumulating conveyor system including a main power conveyor having truck forwarding, sub-floor chain connected trolleys, and a branch or transfer conveyor chain operating beneath the floor and divergently of the main conveyor, the branch conveyor having truck engaging dogs coacting with the main conveyor trolleys in controlling the travel of trucks along main and branch paths. This is accomplished by the controlled engagement of trolley dogs and the branch conveyor dogs with depending tow pins on the trucks.

In accordance with another object, individual control and switching units are operated by the trucks to govern the selective departure of trucks from the main conveyor line onto and along the branch or transfer line, the halting of the trucks to accumulate on the branch, and the return of such diverted trucks to another line, as another reach of the main conveyor.

It is another object to provide conveyor equipment of the sort described, in which the load bearing floor trucks are taken from the control of the sub-floor main conveyor trolleys and advanced into, along and out of the branch line by a positively driven transfer conveyor chain which is individually powered and requiers no particular synchronization of its drive with that of the main conveyor.

Yet another object is to provide an improved exit control switch mechanism governing the exit of load bearing trucks from a main conveyor line onto a branch line at an angle thereto, this mechanism including a novel pivoted pull-out lever unit acting positively on the truck tow pins to transfer the trucks from the control of the main conveyor or trolleys to the control of the branch conveyor dogs.

More specifically, the pull-out lever referred to above is normally held latched in an inoperative position and is unlatched as by a remote push-pull cable mechanism selectively controlled by advancing trucks, whereupon the lever assumes a position in the path of advance of the main conveyor and truck tow pin to be actuated thereby.

A still further specific object is to provide switch mechanism as described, in which the pull-out lever includes a pivoted actuating arm, normally latched in an inoperative position, and a relatively swingable pull-out hook hinged thereon which engages the truck tow pin when the arm is released to operative position and, as the arm is advanced by the trolley, this lever positively urges the tow pin into an arcuate switch-out floor slot connecting the main and branch conveyor floor slots. So diverted, the truck is propelled by the engagement of a transfer conveyor chain dog with the tow pin, as the pull-out hook is cammed away from the tow pin and the lever arm is relatched.

In accordance with the embodiment mentioned in the preceding paragraph a sub-floor control unit is tripped by a selectively adjustable unit on the truck to unlatch the pull-out unit referred to; while in another embodiment a pivoted track tongue or frog is unlatched by a similar sub-floor control.

A general object of the invention is to provide an exit switch device or mechanism of the character described which is simple, rugged and inexpensive in its construction, yet absolutely reliable and shock-free in action. It operates successfully without any drive or control means which needs to be predeterminedly or accurately timed in relation to the main and branch conveyors, relying solely on the trucks for its actuation in this respect.

A further general object is to provide an improved sub-floor control device, in particular of a mechanical nature, to govern the action of the switch mechanism referred to, as by flexible cable means. This device is disposed substantially entirely beneath the floor level, a part thereof coming above the level only when a truck is over that part, and is selectively operated or tripped by an advancing truck, in accordance with a predetermined setting of a tripping actuator on the truck, to initiate action of the switch mechanism, as by unlatchnig its pull-out lever, in the one form, or a switch tongue in another.

In accordance with another object, the invention affords an improved load bearing truck equipped with adjustable trip actuator means as described, to permit selective control of multiple switching operations as the truck advances, and also with an improved cushioned and swiveled tow pin connection to the truck to absorb shock and reduce the towing load on main or branch conveyor chains.

Another object is to provide an improved truck release and reset mechanism which automatically causes disengagement of the transfer chain dog or like conveyor dog from a truck being advanced by that dog, thereby permitting a truck or trucks to be immobilized and accumulate on the branch track. In accordance with a refined embodiment this mechanism has shock absorber provisions to provide a gentle stop under high loads and speeds.

Here, again, it is an object to provide a truck release mechanism which is simple, compact, rugged and economical as to its parts, yet entirely reliable in action. To this end the mechanism comprises a pivotally retractable backing rail section in a fixed backing rail for the branch conveyor dogs, the retracted rail normally causing the transfer dogs to fall away from the truck tow pins and permit the trucks to come to a stop adjacent the release mechanism.

A still further object is to provide a truck release mechanism of the sort described which is automatically and remotely operated by a main line or other conveyor trolley advancing toward the juncture or return entrance zone of the branch line with that line. In the event the advancing main conveyor trolley is unburdened by a truck, a mechanical signal is forwarded to a control unit associated with the retractable backing rail truck release mechanism, causing the backing rail to engage the next advancing transfer conveyor dog with a truck halted at the release point.

In the event the trolley approaching the branch conveyor is burdened by a truck, the signal to the truck release control station on the branch is mechanically cancelled and nullified. Hence the leading truck halted on the branch line will not be restored to the main or other conveyor reach unless and until an empty or unburdened conveyor trolley dog thereof is approaching.

Generally speaking, an object is to provide a conveyor system which may be operated as to its control by a mechanical means throughout, for example under the control of flexible cables, thus to accomplish a great reduction in installation as well as maintenance cost, as compared with electrically, hydraulically and/or pneumatically operating control systems; in which accurate timing of coacting parts, especially the conveyors, is not a factor; yet in which there is no possibility of damage due to mechanical jamming or interference of any parts in their coactive operation.

Nevertheless, though it is an advantage of the system that it may be mechanically operated and controlled exclusively and throughout, it is well adapted for a conversion, involving minimum cost and time, into a system controlled in substantial part by non-mechanical means.

The foregoing as well as other objects will be made more apparent as this description proceeds, especially when considered in conjunction with the accompanying drawings, wherein:

FIG. 1 is a fragmentary top plan view, partially broken away, showing schematically the general layout of the improved conveyor system, in one embodiment thereof;

FIG. 2 is a fragmentary view in transverse vertical section along line 2—2 of FIG. 1, showing features of a chain driven main conveyor subfloor trolley and its track provisions, in relation to a truck tow pin engaged by the trolley;

Figure 5:
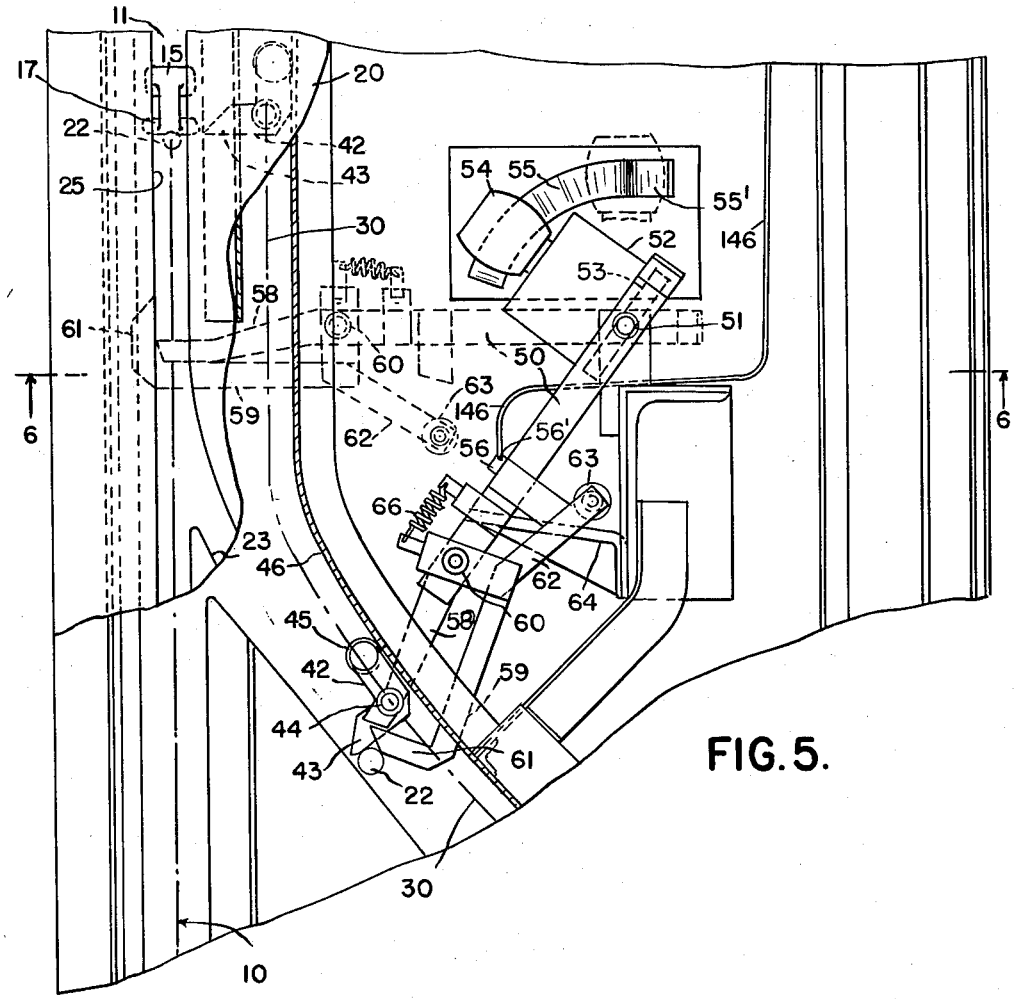
Figure 6:
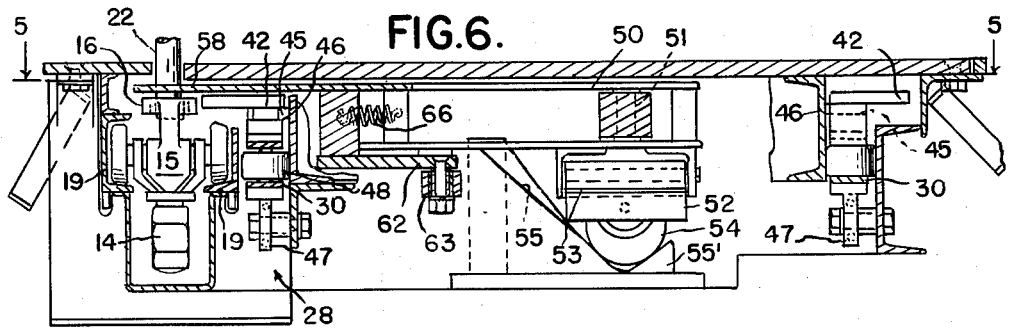
Figure 7:
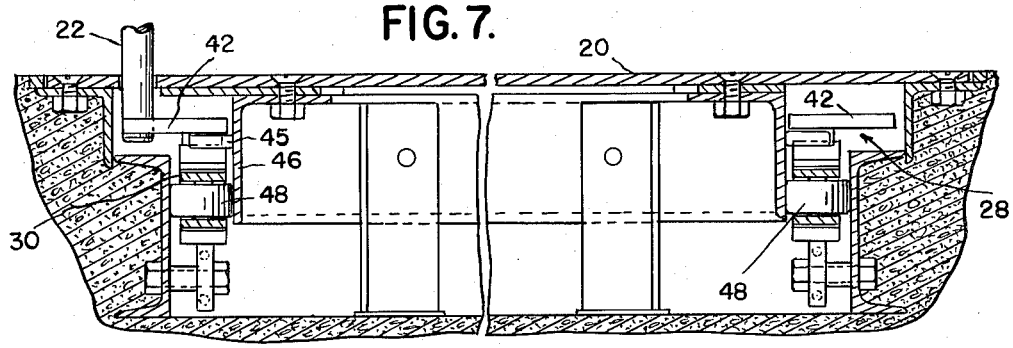
Figure 8:
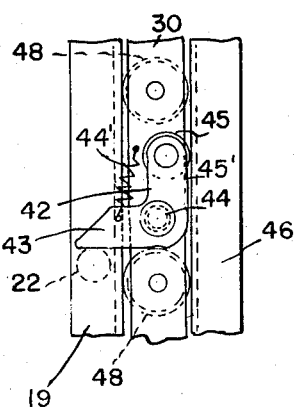
Figure 9:
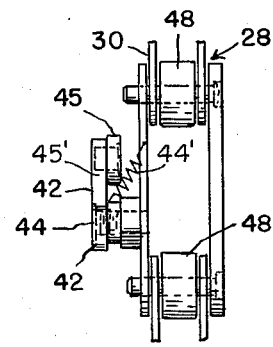
Figure 12:
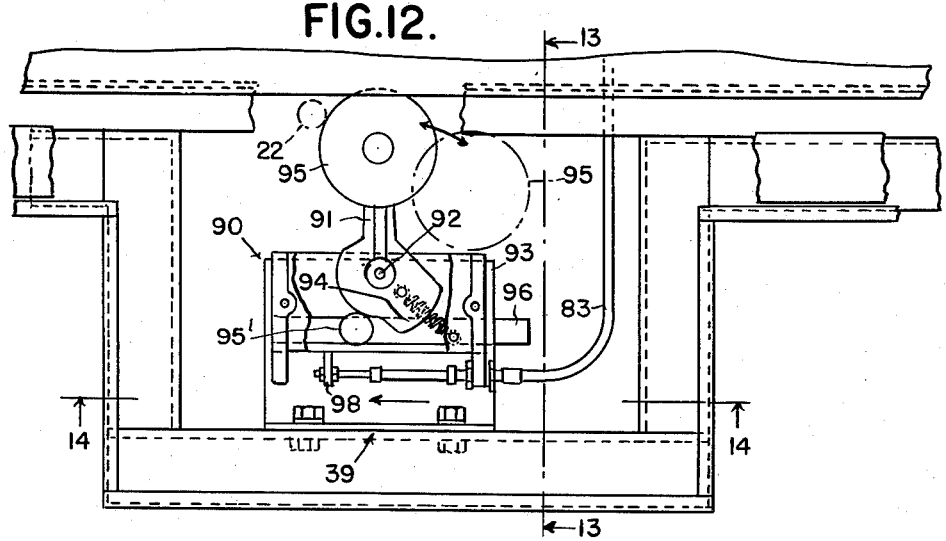
Figure 13:
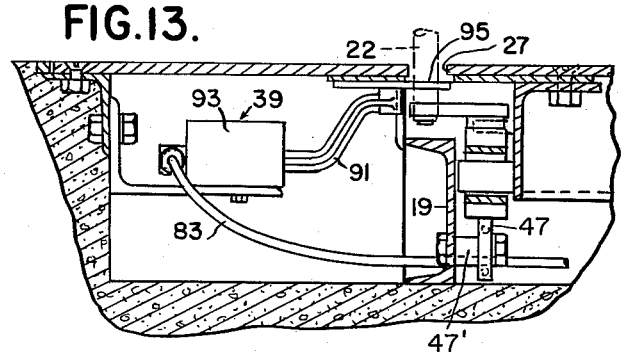
Figure 14:
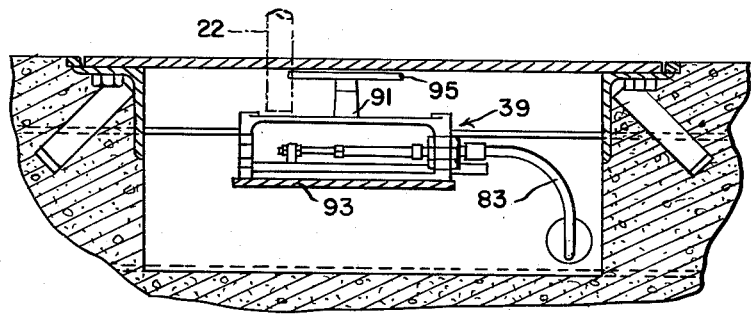
Figure 15:
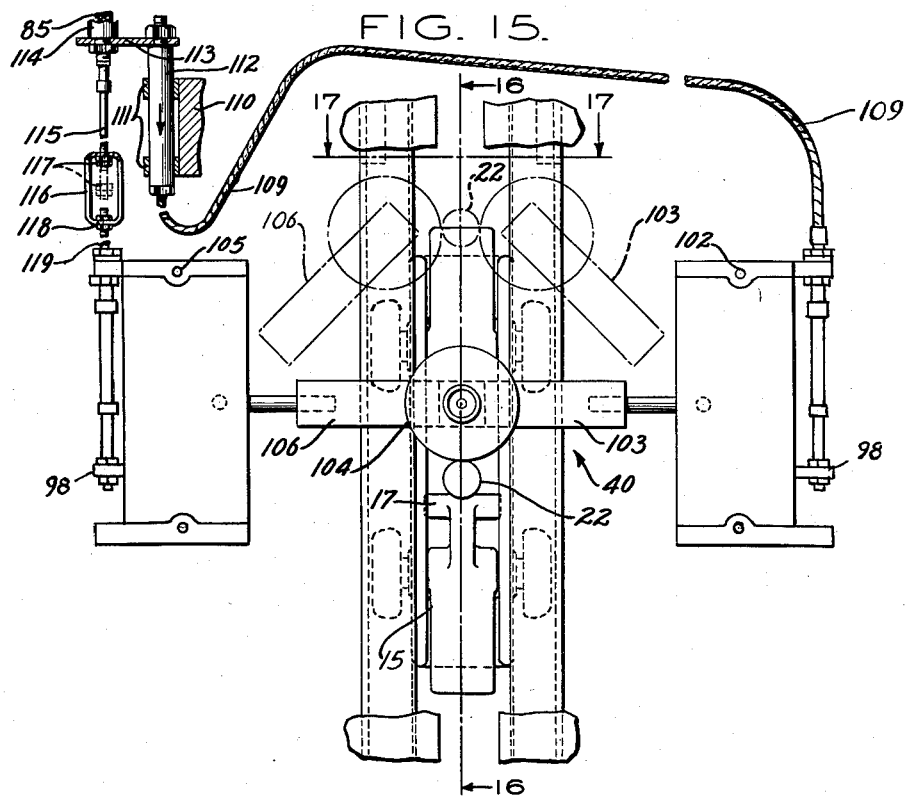
Figure 16:
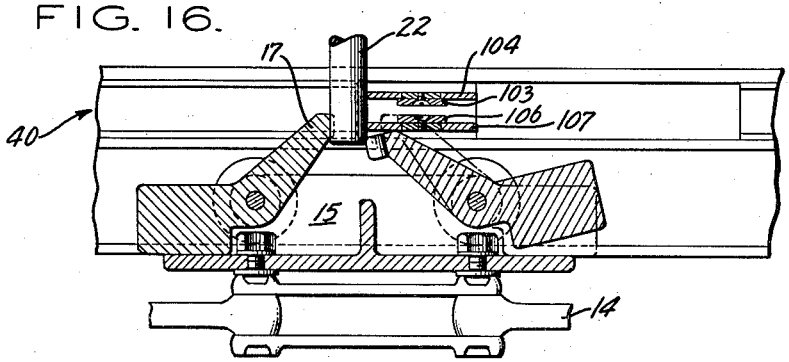
Figure 19:
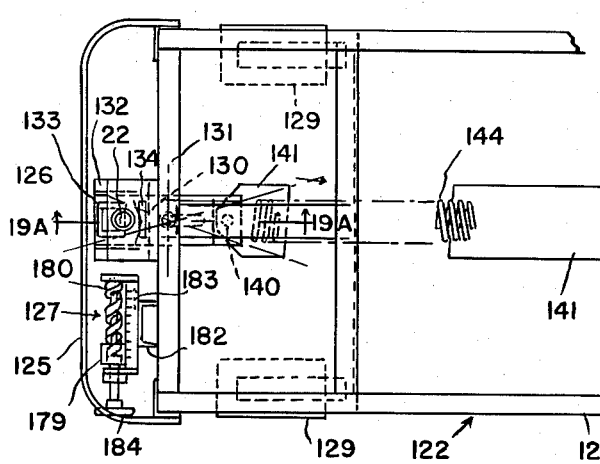
Figure 20A:
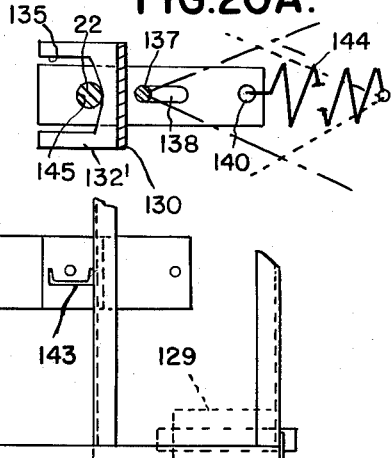
Figure 20:
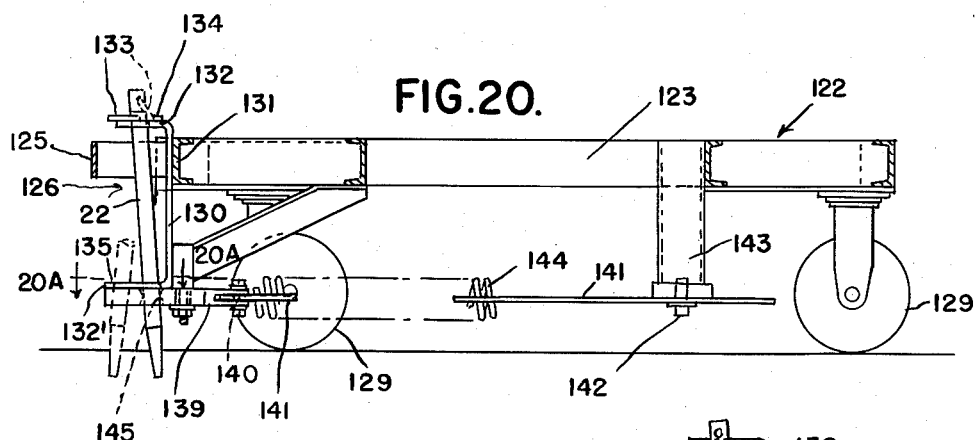
Figure 19A:
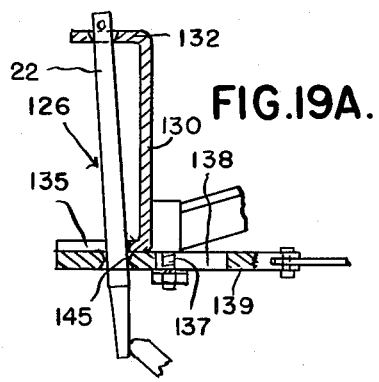

FIGS. 3 and 4 are, respectively, fragmentary views in vertical longitudinal and horizontal section on lines 3—3 and 4—4 of FIG. 2 the direction of travel of the trolley being shown in each instance by an arrow;

FIG. 5 is a fragmentary top plan view, with a substantial part of the floor plating removed for clarity, illustrating the exit or truck pull-out switch unit of the system, different positions of its composite pull-out lever being shown in solid and dotted lines;

FIG. 6 is a fragmentary view in transverse vertical section along line 6—6 of FIGS. 1 and 5;

FIG. 7 is a view in transverse vertical section along line 7—7 of FIG. 1;

FIG. 8 is a fragmentary plan view showing a pivoted truck forwarding dog of the transfer conveyor chain of the system, as guided by a fixed track rail;

FIG. 9 is a fragmentary view in side elevation of the chain dog structure;

FIG. 10 is a fragmentary top plan view showing a releasable dog back-up rail mechanism of a truck release station associated with the branch line of the system, positions of a branch conveyor dog as controlled by fixed and movable track rails being shown in solid and dotted line, respectively;

FIG. 11 is a view in transverse vertical section along line 11—11 of FIG. 10, alternate positions of the truck release mechanism being shown in solid and dotted lines;

FIG. 12 is a fragmentary plan view of a release reset device controlling the operation of the mechanism of FIGS. 10 and 11, under the control of trucks traversing the branch track;

FIGS. 13 and 14, respectively, are views in vertical section along lines 13—13 and 14—14 of FIG. 12;

FIG. 15 is a fragmentary top plan view showing a control mechanism associated with the main conveyor return reach and operating to detect the presence of an unloaded main conveyor trolley, and thus govern the actuation of the branch track truck release mechanism of FIGS. 10 and 11 in preparing a truck for return to the main line;

FIGS. 16 and 17 are, respectively, views in vertical section along lines 16—16 and 17—17 of FIG. 15;

FIG. 18 is a view in longitudinal vertical section along line 18—18 of FIG. 17;

FIG. 19 is a top plan view, partially broken away, of an improved tow truck according to the invention, showing the cushioned and swiveled tow pin assembly and adjustable switch control or trip unit thereof;

FIG. 19A is a fragmentary vertical section on line 19A—19A of FIG. 19, showing a tow pin detail;

FIG. 20 is a view in general longitudinal and vertical section through the truck, indicating in dot-dash line the action of the truck tow pin;

FIG. 20A is a horizontal section along line 20A—20A of FIG. 20.

Figure 21:
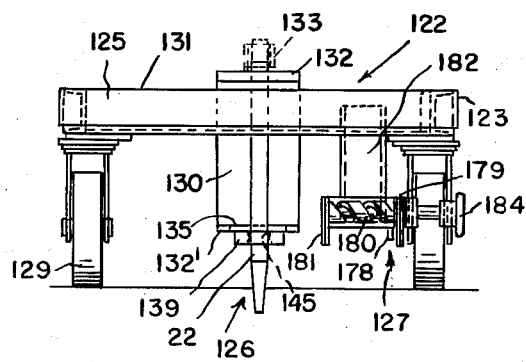
Figure 22:
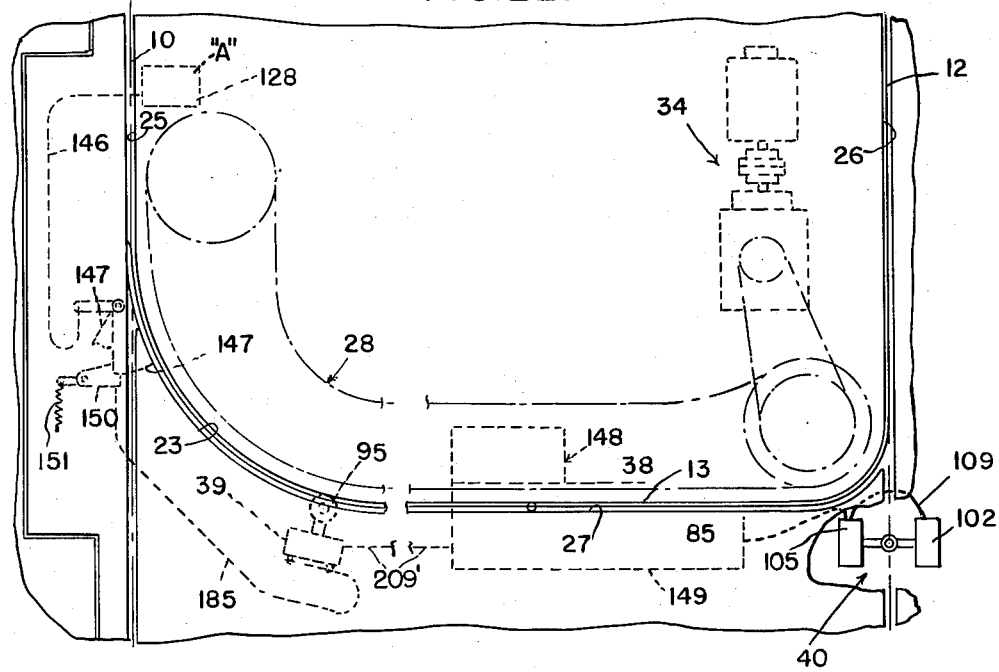
Figure 23:
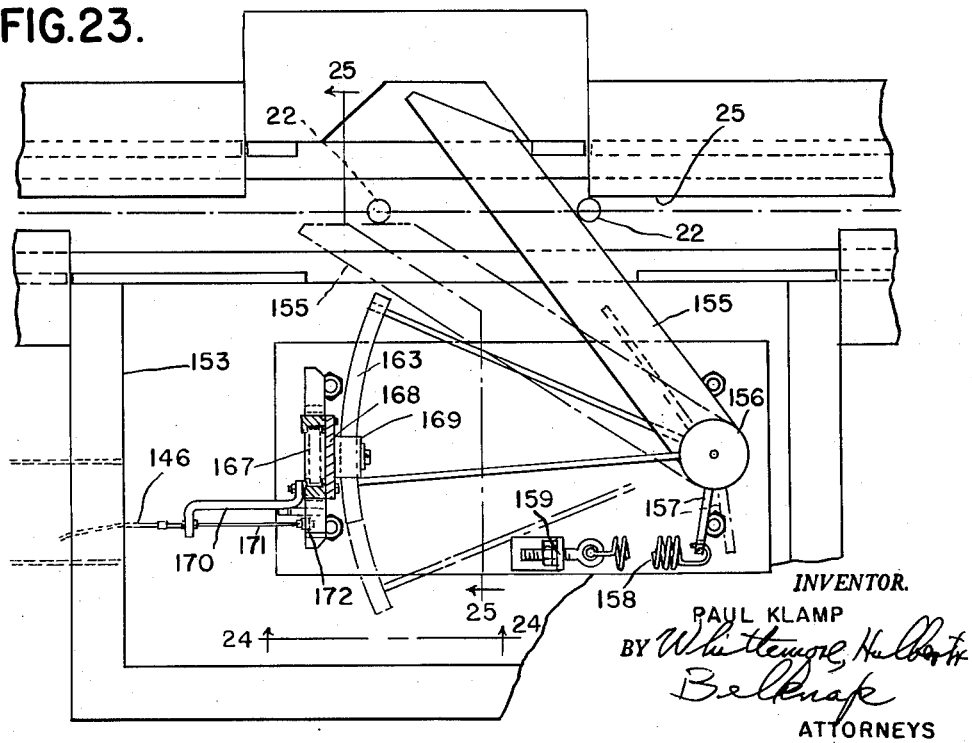
Figure 24:
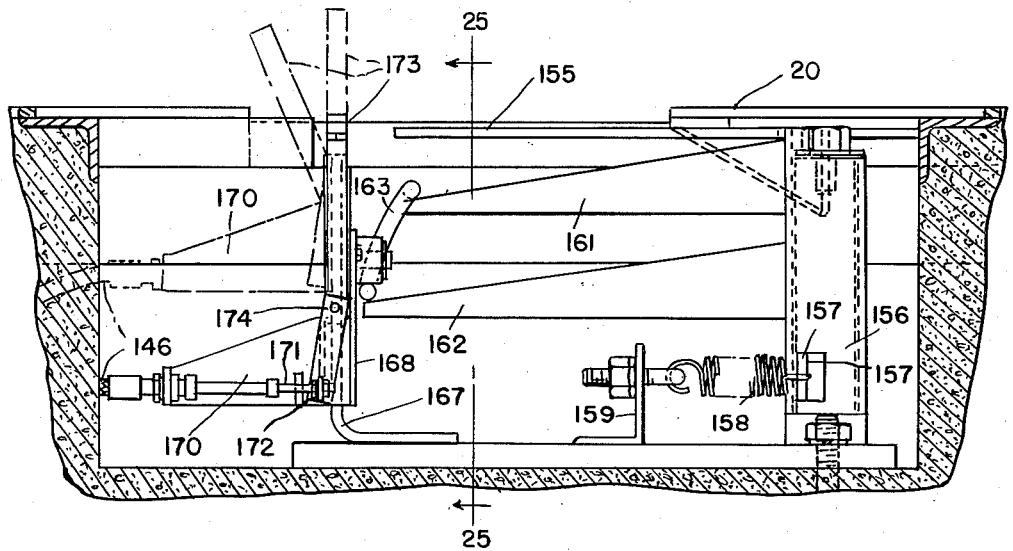
Figure 25:
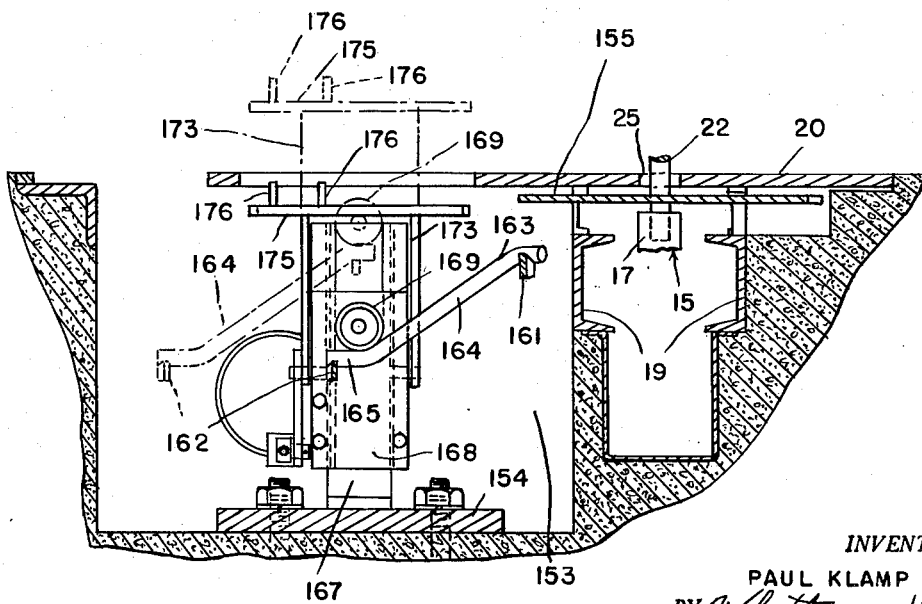
Figure 26:
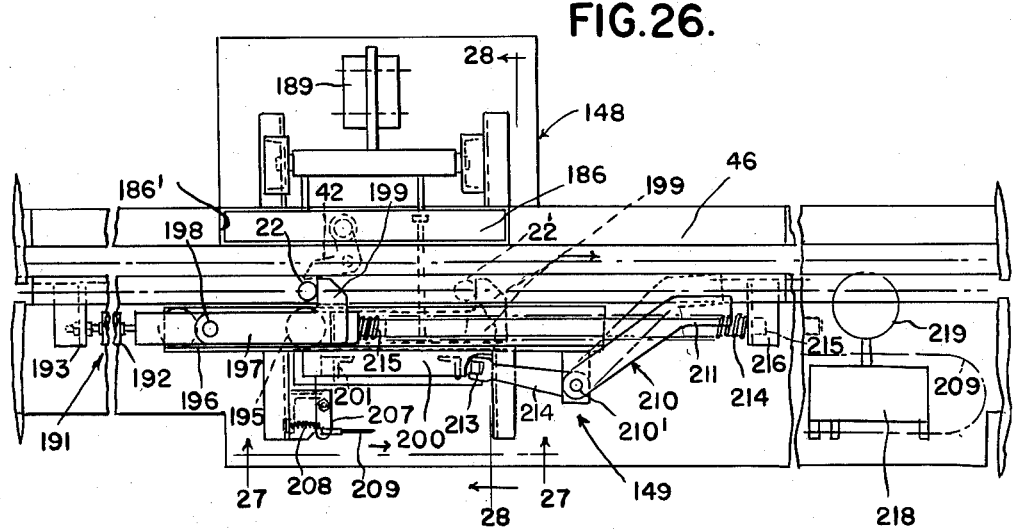
Figure 27:
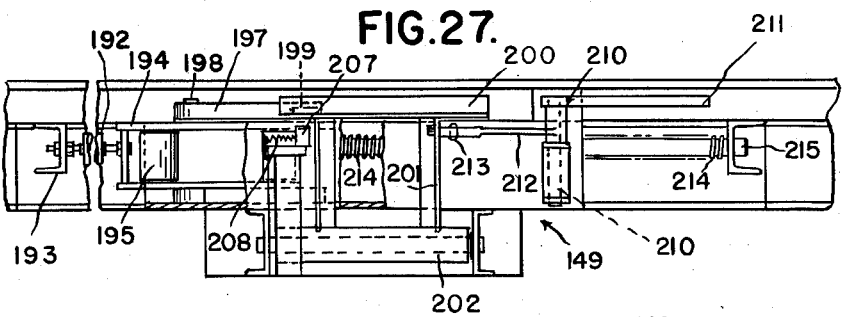
Figure 28:
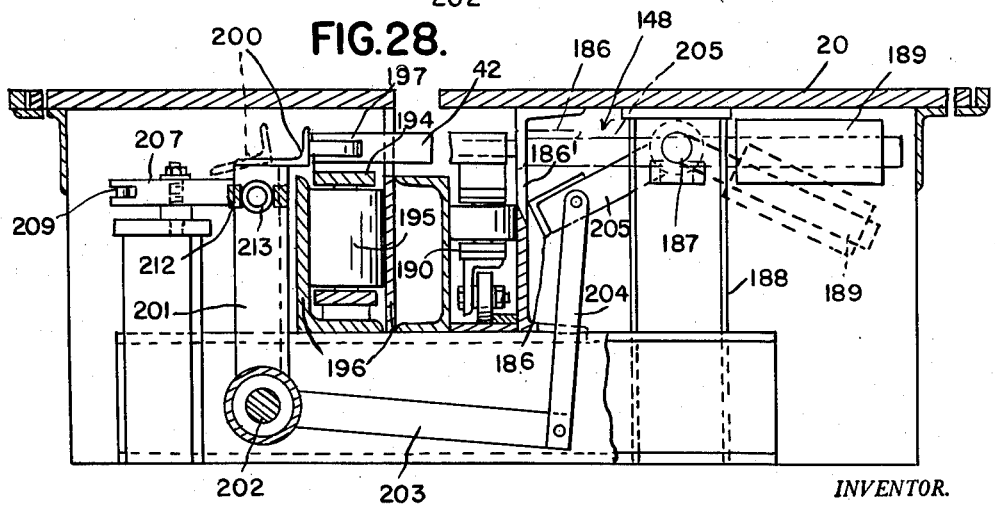

FIG. 21 is a front elevation of the truck;

FIG. 22 is a fragmentary top plan view, schematic in character, of a modified embodiment of sub-floor system according to the invention, having certain units in common with the system of FIG. 1;

FIG. 23 is a fragmentary top plan view of improved sub-floor switch control mechanism of the invention in the area designated "A" in FIG. 22 (as well as in FIG. 1), with the floor plate removed to expose the parts, different positions of which are indicated in solid and dot-dash line;

FIG. 24 is a side elevation of the mechanism of FIG. 23, as viewed from line 24—24 of FIG. 23, different positions of the parts here also being indicated in solid, dot-dash and dotted line;

FIG. 25 is a sectional view along line 25 of FIGS. 23 and 24, further illustrating the sub-floor control in its relation to the conveyor;

FIG. 26 is a fragmentary top plan view of a truck release and reset unit generally similar to that of FIGS. 10 and 11, but with further refinements to cushion the handling of heavily loaded or rapidly traveling trucks, and to automatically control the advance thereof in succession through an accumulation station;

FIG. 27 is a side elevation of the release and reset mechanism of FIG. 26, as seen from the line 27—27 of that figure;

FIG. 28 is a view in transverse vertical section along broken line 28—28 of FIG. 26.

Referring first to FIG. 1 of the drawings for a schematic plan layout of the overall system, the reference numeral 10 generally designates a main sub-floor conveyor, operating in the direction indicated by arrow, and characterized by a longitudinal reach or portion 11 from which it is desired to divert the tow pins of selected load transporting trucks or dollies. The numeral 12 designates another, return reach of conveyor 10, into which it is desired to restore such trucks by conveying them along an intermediate branch reach or track portion 13 connecting the reaches 11 and 12.

It is to be understood that FIG. 1 simply typifies a conveyor cross over and connect installation, and that the invention equally applies to other desired layouts, as for example a dead storage branch associated with a main powered conveyor, a return from such a branch to a conveyor, etc. The invention is unlimited in respect to the simplicity or complexity of the particular desired setting.

As shown in FIGS. 2, 3 and 4, the main sub-floor conveyor 10 includes an endless chain 14 powered from any appropriate source, to which standard type trolleys 15 having counterweighted, retractable front restraining and rear driving dogs 16, 17, respectively, are pivotally mounted in suitable longitudinal spacing, in an entirely conventional manner. The trolleys 15 are spaced on chain 14 at intervals of, say, twelve feet, and rollers 18 support them to ride opposed channel track sections 19 of the main conveyor 10. This structure is appropriately mounted beneath floor plating 20, which is slotted to receive depending tow pins 22 of the load bearing trucks. Structural details of the truck, truck tow pin arrangement and associated means to govern the operations of transferring the control of the trucks to and from a branch track conveyor are hereinafter described.

Communication of the branch 13 with the main conveyor reach 11 is established through an arcuate floor slot 23; while communication of the branch track 13 with the other or main conveyor return reach 12 is similarly had through an arcuate floor slot 24. The floor slot of the main conveyor reach 11 is designated 25, that of the return reach 12 is designated 26, while the intermediate floor slot of the branch or transfer conveyor reach 13 bears the reference numeral 27.

The transfer conveyor is generally designated 28. As shown in FIGS. 1 and 6-9, it takes the form of an endless chain 30 trained about a vertically journaled idler sprocket 31 adjacent main reach 11 and at its opposite extreme about a driving sprocket 32 adjacent the track return reach 12. Conveyor 28 traverses an orbital path which is generally U-shaped as viewed in plan, in conformity with the outline of branch reach 13 and its merger with the main reaches 11, 12.

The numeral 33 generally designates an independent driving unit for the branch conveyor; it may consist of a motor 34, a speed reducer 35 driven thereby to drop the speed of the sub-floor conveyor chain 30 to about one-half of that of the main conveyor chain 14, and a chain and sprocket arrangement 36 through which the driving connection to chain sprocket 32 is made.

The reference numeral 37 generally designates (FIG. 1) an automatic pull-out switch mechanism adjacent the zone of exit from main reach 11; the reference numeral 38 generally designates a truck release mechanism associated with branch reach 13 adjacent the return or reentrance reach 12; the reference numeral 39 generally designates a truck release reset unit in part controlling the mechanism 38; and the reference numeral 40 generally designates a control mechanism or station adjacent the main return reach 12, in advance of the branch 13, at which the control of the truck release mechanism 38 is perfected. This is done by automatically detecting and signaling as to whether or not a conveyor trolley 15 approaching on the reach 12 is hooked to and forwarding a truck. Mechanism 40 is hereinafter referred to as an empty place spotter.

Reference should now be made to FIGS. 5 and 6, dealing with the structure and operation of the pull-out switch mechanism 37, in conjunction with FIGS. 8 and 9, showing a detail of the transfer conveyor chain 30.

The chain 30 is provided, at intervals of, say, two feet, with pivoted truck driving dogs 42 of L-shaped outline.

Each dog has a foot 43 engageable with a truck tow pin 22 to advance the same, a medial pivot at 44 to a link of the conveyor chain 30, and a follower roller 45 above the chain on an arm 45' at 90° to the foot, which roller normally engages an upright side guide rail 46, against which it is urged counterclockwise, as by a tension spring 44' acting between its pusher foot 43 and a link of the chain 30, to maintain the dog 42 in the operative position of FIG. 8. However, as hereinafter described, the dog is adapted to swing backwardly upon arrival at the truck release mechanism or station 38 adjacent branch track 13.

It will be seen by reference to FIGS. 5, 6, 7 and 13 that the branch or transfer chain 30 is supported for sliding movement by appropriate provisions, such as the rollers 47 therebeneath supported by track section 19, with a spacer 47' interposed. It is also provided with vertically journaled guide rollers 48 operating with reasonable rolling clearance between the guide rail 46 and the adjacent side of a trolley track section 19 which they engage to guide the chain 30 about the path depicted in FIG. 1. Furthermore, it is seen by reference to FIGS. 5 and 6 that the transfer chain 30 and its pusher dogs 42 approach the pull-out switch mechanism 37 in parallel, side by side relation to the main conveyor chain 14 and trolleys 15 and their dogs 16, with little lateral clearance between the respective dogs.

The pull-out switch mechanism 37 (FIGS. 5 and 6) includes a primary pull-out lever or control arm 50 appropriately journaled at 51 beneath the floor plate 20 on an upright pivot pin. Adjacent the pivot pin 51, the arm carries a piece 52 on a horizontal hinge pin 53, and a barrel shaped cam follower roller 54 is journaled by the piece 52 on a horizontal axis. This roller is weighted and is adapted to roll upon a fixed arcuate helical cam track 55 (FIG. 6).

The pull-out lever or control arm 50 is normally held in the solid line position of FIG. 5, with its follower roller atop the highest rise of the cam track 55, by means of a latch 56 engaging a side of the lever, this latch being connected to an adjacent end 56' of a flexible cable device (to be described). When the latch is released from this engagement, as by actuation of said flexible cable under the control of an advancing truck, as hereinafter described, the pull-out lever 50 is swung clockwise, under the gravitational force of the descending weighted roller 54 on cam track 55, to its operative position shown in dotted line in FIG. 5. Here the lever 50 awaits engagement by the advancing main conveyor trolley dog 17. The lever is restrained in this position by engagement of roller 54 with an end stop shoulder 55' on track 55.

In this way the lever 50 is brought to its operative position without undue shock, as would be the case were a spring employed to operate it.

The lever 50 is angularly offset somewhat at 58 adjacent its outer end, and in the dotted line position extends beneath and across the main conveyor floor slot 25. Radially inwardly of the angular offset 58 the lever or arm 50 has a pull-out or diverting arm or hook 59 pivoted thereon by a vertical hinge pin 60, and the hook 59 terminates in a rearwardly disposed hooking finger 61, which lies on the side of the slot 25 remote from the hook arm pivot 60.

Hook or diverting arm 59 also carries an angular extension 62 equipped with a cam follower roller 63. This roller is adapted to engage a fixed inclined cam 64 when the arm 50 is swung from the dotted line position of FIG. 5 into its solid line, inoperative, position in which it is latched by latch arm 56. The camming action causes the hook finger 61 of the arm 59 to turn individually counterclockwise about its pivot 60. Hook finger 61 thus swings out of the way of the truck tow pin 22, having in its movement up to this point drawn the tow pin into the arcuate switch-out floor slot 23 leading to the branch track 13. A coil spring 66 resists this individual swing, and restores the hook 59 to the dotted line position of FIG. 5 once the follower roller 63 disengages cam 64.

The automatic switch actuating provisions to unlatch lever 50 from latch arm 56 are shown in FIGS. 22 and 23 and will be hereinafter described in relation to associated structural details of the truck, shown in FIGS. 19-21.

In traversing the branch track 13 the branch conveyor pusher dogs 42 are restrained from clockwise rotation, as viewed in plan in FIG. 5, by rolling engagement of their follower roll 45 with the upright rail 46, which follows the contour of the floor slots 25, 23, 27, until arrival at the truck release station 38, as will be described. Since the main track chain 14 and trolleys 15 are driven at about twice the speed of the branch track chain 30 and its pivoted pusher dogs 42, these dogs may swing counterclockwise, as viewed in plan, in the event that they are overtaken by an advancing truck tow pin 22, thus permitting the tow pin to clear the dog and advance ahead of the same, for subsequent pick-up by that dog.

The switched trucks are pushed by the branch track conveyor chain 30 until they reach the truck release mechanism-station 38, at which it is desired that they halt. This is accomplished by permitting the dog 42 to release from the tow pin, and swing clockwise, as viewed from above (see FIG. 10); and such release is under the control of the truck release unit 39 appearing in FIGS. 12 through 14. Structural features of the release mechanism or station 38 appear in FIGS. 10 and 11 of the drawings.

Referring first to FIGS. 10 and 11, the reference numeral 70 generally designates a movable dog back-up rail located in a gap 71 of the fixed backing rail structure 46, in the truck release zone of the branch track 13. A suitable rigid supporting bracket or frame work 72 of U-shaped outline is mounted adjacent the track in this zone, which is provided with a longitudinally disposed pin 73 upon which is journaled an elongated bearing hub 74, to which the back-up rail 70 is secured by arms 75. The rear counterweight 76 normally urges the rail 70 clockwise, as viewed in FIG. 11, and upwardly into longitudinal alignment with the portions of the backing rail 46 at either end thereof. However, the rail 70 is normally held in the depressed, solid line position of FIG. 11, in which it is ineffective to hold the branch track dog 42 in driving engagement with the truck tow pin 22. This is accomplished by use of a hooked latch arm 78 journaled on an upright pin 79 on bracket 72, the arm engaging a detent shoulder 80 which is carried by a depending bar 81 secured to the back-up rail hub 74.

A flexible reset cable 83 is secured to a fixed downward projection on the hub 74, and is employed in automatically resetting the back-up rail 70 to its depressed position shown in solid line in FIG. 11. A further flexible cable 85 has a slotted one-way pull connector 86 connecting it at 87 to the outer end of the latch arm 78, so that when the cable 85 is tensioned, the movable back-up rail 70 is unlatched for a counterweighted return to the dotted line position of FIG. 11, in which it laterally sustains the branch conveyor dogs 42, being coplanar with its pivot 73.

The cable 83 is tensioned to set the rail 70 in the depressed position by the truck release reset unit 39, in regard to which reference should herein be made to FIGS. 12, 13 and 14. The reference numeral 90 generally designates a cable pull mechanism involving a trip arm 91 pivoted at 92 on a supporting frame 93 and provided with an operating cam 94 at its pivot. The outer end of the arm 91 carries a tappet roller 95 of substantial diameter, which is adapted to be engaged by an advancing tow pin 22. So engaged, arm 91 is swung clockwise to its dot-dash line position as viewed in FIG. 12, the cam 94 engaging and operating a follower 95' on a rod 96 which is slidably mounted by the frame 93. Rod 96 is connected by a lateral lug 98 with the cable wire of the flexible cable 83 of the truck release mechanism 38 (FIGS. 10 and 11). Thus the movable back-up rail 70 is pulled to its depressed position, in which it is hooked and held by the latch arm 78. A coil spring 100 maintains the latching engagement until it is released by operation of the flexible cable 85, as will be described.

Trucks thus halted at station 38 will accumulate there, being automatically uncoupled from branch conveyor 28, until a main track trolley 15 which is unburdened by a truck advances along the return reach 12 of the main track. When this occurs it is in order to continue the advance of the first truck halted at station 38. As explained above, the movable back-up rail 70 is unlatched and swung upwards to its dotted line position of FIG. 11 to do this.

The empty place spotter 40 is provided in order to insure that a truck will not be returned to the main line until the advancing main conveyor trolley is free. As indicated in FIG. 1, this unit is connected by the flexible cable 85 with the truck release mechanism 38.

Referring now to FIGS. 15 through 18 of the drawings, the empty place spotter 40 comprises two cable pull mechanisms similar to the mechanism 90 of the truck release reset unit 39. Their action is the same as the action of that unit, hence it has not been deemed necessary to repeat details of their structure in FIGS. 15 through 18. Of the two cable pull units, that designated 102 in FIGS. 15 and 17 is a unit having its operating arm 103 and tappet roller 104 actuated only by truck tow pins 22, since the arm and roller are positioned at a sufficient elevation to be missed by a trolley 15. The other cable pull unit, designated 105, has its operating arm 106 and tappet roller 107 positioned sufficiently low that they are engaged and operated by either an empty or loaded conveyor trolley 15.

Empty place spotter 40 is cable connected to the truck release mechanism 38 in such manner that the latter will be operated to raise the back-up rail 70 to its operative position only in the event a trolley 15 free of a truck is advancing on the main track return reach 12. To this end a flexible disabling cable 109 operated by the cable pull unit 102 is brought out to a fixed support 110 having guides 111 in which a guide rod 112 connected to the cable 109 slides. At its other end the rod 112 carries an arm 113 to which is clamped the outer sheath 114 of the flexible cable 85 leading to truck release mechanism 38. Thus, upon movement of the guide rod 112 of cable 109 downward, as viewed in FIG. 15, under a pull of disabling cable 109, the cable 85 is moved bodily, with no tensioning of its internal wire element 115.

The adjacent end of this tension element 115 is slidably received in one end of an open-sided rectangular connector link 116 and is provided with an enlarged head 117 inwardly of the outline of the link, which may be engaged by the latter to pull the wire 115. Thus, it is seen that bodily shifting movement of the cable 85 will move the element 115 and head 117 from their solid line position of FIG. 15 to the dotted line position. The link 116 is fixedly connected at its opposite end 118 to a cable 119 operated by the cable pull unit 105.

Accordingly, as an empty trolley 15 approaches on the main track return reach 12, it will operate the arm 106 of cable pull unit 105. This shifts cable 119, link 116 and the tension element 115 of flexible cable 85 to the left, whereupon cable 85 releases the latch arm 78 (FIG. 10) for the movable backup rail 70. The latter is moved by its counterpoise 76 to its upper, operative position, whereupon a truck halted at the station 38 will then be picked up by the next advancing branch conveyor dog 42, and forwarded onto the main track return reach 12. It is picked up by the empty trolley 15 which initiated the cable signal.

However, in the event that the advancing trolley is occupied by a tow pin 22, the latter will engage and operate the arm 103 of the cable pull unit 102, just as the unit 105 is actuated. This bodily shifts cable 85 to such a position (dotted line in FIG. 15) that the simultaneous tensioning of the connector link 116 by unit 105 is ineffective to tension the wire element 115 of the cable. Accordingly, a truck at the station 38 is missed by the branch conveyor dog 42, since the latter release unit 38 is not cable operated.

It is desirable to time the travel of the branch track chain 30 in relation to that of main track chain 14 only sufficiently closer to minimize the likelihood of interference of a branch and main conveyor dog 42, 17, respectively, as they approach the junction of the two tracks. If desired, an appropriate lateral clearance may be set up to avoid this possibility, and it is not especially serious, in any event, in view of the fact that the branch conveyor chain 30 travels at but half the speed of the main chain 14, and that the branch pusher dogs 42 are pivoted for counterclockwise rotation about their axes. A trolley 15 will always speed past and clear a dog 42 should engagement take place.

FIGS. 19, 20 and 21 show structural details of the truck controlled by the system. The truck, as employed in that system as well as the alternative system to be described, is generally designated by the reference numeral 122. It has a well braced sheet metal platform 123, a rigid forward bumper bar 125, rounded at its ends, a depending tow pin unit 126, of which the tow pin 22 is a part, and an adjustable, comb-type switch control device or unit 127. The unit 127 coacts with the selective switching mechanism 37, as tripped or actuated by a signal station 128 located to the rear of it along the main track, in determining the release of the switch latch arm 56 (FIG. 5) and the consequent pull-out of the signaling truck 122 from the main conveyor line 10 onto the branch track 13.

Alternatively, the comb unit 127 may trip a similar signal station 128 associated with the embodiment of FIG. 22. Details of the signal station appear in FIGS. 23–25 and are hereinafter described, and details of the truck-mounted control unit or device 127 will be discussed in that description.

Referring again to FIGS. 19 through 21, the track platform 123 is appropriately supported on heavy duty forward and rearward swiveled caster pairs 129, and has a U-shaped bracket 130 welded to the center of its front frame cross piece 131, horizontal top and bottom flanges 132, 132' of the bracket facing forwardly.

The tow pin 22 is received in an aperture in the upper flange 132 of bracket 130, being equipped with a lifting ring 133 at its top, by which it may be manually elevated if it is desired to prevent engagement of the pin by a main track or branch conveyor dog for any length of time. The lifting ring is then swung to the dotted line position of FIG. 20, in which it is sustained by a small cleat 134 on the bracket to hold the pin raised.

Adjacent its lower end, as indicated in FIGS. 19 and 19A, the pin is received in a laterally enlarged, forwardly opening recess 135 in the bottom flange 132' of bracket 130, from which bracket a small fixed lug or pin 137 depends through an elongated slot 138 in the forward end of a floating longitudinal pull bar 139. The pin is headed to maintain the lost motion connection. The rear extremity of the bar 139 is pivotally connected at 140 with the forward end of a swiveled tension link 141, and the rear extremity of the link 141 is swiveled horizontally on an upright pivot 142 to a suitable rigid upright bracket 143 which depends from the truck body.

A relatively strong coil spring 144 acts between an anchor to the bracket 143 and the forward floating pull bar 139, to which the forward end of the spring is appropriately secured.

The lower end of the tow pin 22 extends through an aperture 145 in the forward end of the floating pull bar 139, the edges of the aperture 145 being beveled or rounded (as are the edges of the tow pin aperture in the upper bracket flange 132), to permit a relative rocking action of the pin therein as the latter swings between its solid and dotted line positions indicated in FIG. 20. This motion may be of a length of, say, 3½" at the lower end of the pin.

It is seen from the foregoing, that the pivotally articulated pull bar 139 and link 141, through which ultimate positive towing force is transmitted to truck 122 from the tow pin 22, when engaged by a sub-floor driving dog, accommodates the application of pulling force on dot-dash lines to either side of the longitudinal center line of the truck (see FIG. 20A), as well as along that center line.

Further, the tension spring 144 affords an anti-shock cushion for the application of the towing force, before a rigid mechanical pulling connection occurs, yielding to permit the pull bar 139 to advance the length of the elongated slot 138 therein prior to positive mechanical engagement.

The swiveled and cushioned tow pin connection occasions substantial reductions in the load imposed on the sub-floor conveyor 10 or transfer chain 30 in putting the truck 122 in motion. Actual tests of a well loaded truck engaged by a conveyor dog show that, lacking the cushioned swivel spring provision, the tow load on the conveyor ranges from 32% to 62% of the total weight of truck and load, depending on whether the pulling force is exerted on tow pin 22 at a right angle to the conveyor track, in an intermediate angular relation or in line with the track. However, equipped with the spring, the conveyor load ranges from but 11.4% to 26% of the total towed load, in the respective angular relationships just mentioned.

These figures are based on tests in which the towing conveyor chain in each case traveled at a speed of 100 feet per minute. At a uniform speed of 50 feet per minute, the percentages with the cushioned equipment ranged from 6.3% to 7.5% of total truck weight with the spring 144, as compared to a range of 9.9% to 24% without the spring.

FIG. 22 of the drawings schematically depicts a modified system or installation according to the invention, having certain operating and control units in common with the form of FIG. 1. Thus, for example, a dog-equipped transfer conveyor is generally similar to the conveyor 28, though arranged in a somewhat different outline, and therefore this conveyor, as well as parts associated therewith, are designated by reference numerals corresponding to those of FIG. 1, and further description thereof is dispensed with.

Similarly, the system of FIG. 22 has, in common with that of FIG. 1, a reset signal unit or station 39 like that of FIGS. 12, 13 and 14, an empty place spotter unit 40 like that of FIGS. 15–18, a signal unit or station 128 (which will be hereinafter described and which may be applied to either system), and a transfer conveyor drive unit 34 corresponding to that of FIG. 1.

As indicated above, the main conveyor signal unit or station 128 will optionally control the release of the latch 56 of the switch mechanism 37 of the first form of system, as by tensioning of its flexible cable connector 146, and the same cable connector is employed in the tripping and release of a switching tongue 147 in the alternative system of FIG. 22, in the manner hereinafter described particularly with reference to FIGS. 23–25.

In addition to the components mentioned above which correspond to units of the first embodiment, the system of FIG. 22 incorporates a tow pin release and reset unit 148 which is generally similar to the unit 38 of FIGS. 10 and 11; an improved cushioned, anti-shock type, automatic truck accumulator and release unit 149, which is mechanically coupled to and coacts automatically with the release and reset unit 148 under the control of advancing trucks; and a pivoted latch 150 which is urged by a coil spring 151 in a direction to engage and normally maintain the truck switch tongue 147 in the position shown in FIG. 22, in which trucks 122 traversing main track 10 are diverted onto the branch or transfer track 13. The tongue 147 is a conventional frog type.

Referring now to FIGS. 23, 24 and 25, the signal unit or station 128 has its parts housed within a sub-floor well 153 of the installation, being rigidly mounted on a base plate 154. A control member in the form of an operating lever 155 extends laterally outwardly from this space beneath and across the floor slot 25 of the main conveyor reach, this lever being secured on a tubular post or sleeve 156 which is journaled on an upright axis within the well 153, adjacent the rear end of the latter. A lateral arm 157 extends from the pivot sleeve 156 at the bottom thereof, and this arm is urged by a coil tension spring 158 connected to a fixed anchor 159, so as to swing the control member or lever 155 clockwise, as viewed in FIG. 23, to a fully projected position across the path of the truck tow pins 22. It is mechanically engaged by these pins to swing it counterclockwise from the solid to the dotted line position of FIG. 23.

Sleeve 156 is also equipped with a pair of vertically spaced, divergently projecting upper and lower arms 161, 162, which arms have a shaped cam rod 163 welded or otherwise secured to their outermost extremities. The shape of the cam rod 163 appears in FIGS. 23, 24 and 25; it extends from a relatively elevated point at its connection to the upper arm 161 downwardly at an angle at 164, thence to a horizontal terminal portion 165 at its connection to the lower arm 162.

An upright fixed guide 167 in the form of a rigid L-shaped strap is secured on the base plate 154 forwardly of the cam rod 163. As best illustrated in FIG. 23, the upright portion of the strap 167 guides a slide member 168 which is of generally U-shaped cross section, and the slide 168 provides a mount for a horizontally journaled cam follower roller 169. Roller 169 rides on the cam rod 164, as best shown in FIG. 25.

The slide member 168 is formed to provide an internal way which engages opposite vertical edges of the guide strap 167, sliding freely up and down the latter as the cam rod 164 is swung from the solid line position of FIGS. 23–25 to the dotted line position. The opposite side of the slide 168 has a bracket 170 fixed thereon which anchors the cable sheath encasing the movable wire tension element 171 of the flexible cable 146, the opposite, remote end of which is connected to the switch tongue 147 of FIG. 22, or to the latch 56 for the pull out unit 37 of FIG. 1.

The near end of the cable tension element 171 is secured at 172 to the lower extremity of a comb-type actuator arm 173 which is pivotally mounted on the slide 168, as by a pin 174 disposed at a right angle to a side of the slide.

Thus, it is seen that as the cam rod 163 is swung counterclockwise (FIG. 23) to elevate the follower roller 169, the slide 168 correspondingly elevates the bracket 170 and actuator comb 173 from the solid to the dot-dash line position of FIG. 24, in which it is disposed sufficiently above floor plate 20 to be engaged by an adjustable element of the control unit or device 127 on an advancing truck, as will be described.

As indicated in FIG. 25, the actuator 173 comprises a transversely extending plate or like mount 175 equipped with one or more upstanding teeth 176, any one of which is engaged or not by the control unit 127 on a truck 122, depending upon the setting of the latter. If so engaged, the actuator comb 173, as located by lever 155 in the elevated condition shown in dotted line in FIG. 24, is swung laterally counterclockwise or forwardly with the result that the flexible cable tension wire 171 is drawn to the right.

Engagement of the truck-borne control device or unit 127 with the actuator 173 is determined by the lateral adjustment of its own comb teeth or tappet element 178 (FIGS. 19 and 21). This element is carried by a collar 179 which threadedly engages an adjusting worm or screw 180 journaled in a bracket 181 at the forward end of the truck 122, the bracket being suspended by a fixed hanger 182 depending from the truck body. As indicated in FIG. 19, the bracket 179 may be appropriately calibrated at 183 to facilitate the lateral adjustment of the tappet or tooth 178 so as to position it to engage the actuator tooth 176 of the sub-floor unit and trip the actuator 173 or not, as described. Rotation of the screw 180 is effected conveniently by manipulation of a handpiece 184 extending to one side of the truck.

A simple type of comb trip arrangement is depicted in FIGS. 19 and 21 and in 23, 24 and 25, for use in a case where but a single switching operation is desired. However, it is within the contemplation of the invention that multiple switching operations may be performed, as by equipping the comb plate 175 with a number of laterally spaced teeth 176 which may be engaged or missed by coacting comb tooth or tappet means 178 on the truck, of which there may also be a number. Thus, further switching of the truck, as diverted or not diverted by either of the switch mechanisms 37 or 147, may be provided for.

Now referring to FIG. 22 in connection with the alternative system, the switch tongue 147 is shown in the position in which it is placed by actuation of the signal station 128, a truck arriving at that station having caused the tensioning of the flexible cable 146 to swing the tongue counterclockwise. This is done against the opposition of spring means (not shown) biasing the tongue 147 clockwise, as viewed in FIG. 22, and the tongue is retained in the counterclockwise setting by the spring biased latch 150, so as to divert the signalling truck 122 onto the branch reach 13.

Having passed the tongue 147, the truck tow pin 22 next operates a signal unit 39 of the type shown in FIGS. 12, 13 and 14, with the result that its flexible cable 185 is tensioned, pulling the latch 150 clockwise (FIG. 22) and releasing the switch tongue 147; it thereupon swings back clockwise as viewed in FIG. 22 to the position in which it permits straight-through travel on the line of main conveyor 10. If the next truck fails to trip signal station 128 it proceeds undiverted along the main track 10. Otherwise, tongue 147 is reset to switching position.

Referring now to FIGS. 26, 27 and 28 in conjunction with FIG. 22, the automatic, anti-shock truck accumulator and release unit 149 is, as indicated above, mechanically coupled with a release and reset unit 148 of a kind somewhat similar to the unit 38 of FIGS. 10 and 11. It includes a rail or track section 186 similar to the rail or track section 70, and similarly disposed in a cut out portion 186' of the branch track 46. The units 148 and 149 are disposed in a well space beneath the floor plate 20, track section 186 being carried on an arm appropriately pivoted at 187 on an upright support 188, and being equipped with a counterweight 189 which urges the same in clockwise direction (FIG. 28).

The reference numeral 190 generally designates roller type guide means associated with the branch conveyor 28, of a type similar to that employed in the first form of the system. It is seen that upon operation of the rail section 186 in opposition to its counterweight, i.e., to the downwardly retracted position shown in solid line in FIG. 28, the branch conveyor dogs 42 are permitted to swing to the position shown in FIG. 26, thus drivingly disengaging the truck tow pin 22 as in the first embodiment.

The unit 149 provides shock absorber means to cushion and gently stop the truck 122, such as are of particular value in the event the system is operating rapidly or handling heavy truck loads passing into the branch track. To this end, a shock absorber unit 191 is provided, the unit 191 being entirely conventional in nature and its cylinder being designated 192. One end of the cylinder is anchored to a fixed bracket 193 beneath the floor plate, and the other end of its plunger (not shown) is attached to a sliding carriage 194. Carriage 194 is equipped with a vertically journaled anti-friction roller 195, which operates between the vertical walls of a fixed guide way 196. A hooked stop dog 197 is pivoted at 198 upon the top of carriage 194, the dog 197 having a right angle stop lug 199 which projects across the path of the truck tow pins 22 in the operative, truck stopping position of dog 197.

The latter is laterally sustained in this position by a pivotal backing rail or track 200 constructed of a length of angle iron, which track extends along one side of the path of sliding movement of the dog 197, i.e. the side opposite the truck release and reset unit 148. Backup rail 200 is fixedly mounted on the upper end of an arm 201 which is suitably mounted at 202 on appropriate fixed framework. A bell crank extension 203 of the arm 201 extends across and beneath the conveyor parts, being pivotally connected by means of an upright arm 204 with the arm 205 which carries the truck release and reset track or rail section 186.

By these provisions the conveyor dog release section 186 and the shock absorber backup rail 200 are mechanically coupled as a linkage, the arrangement being such that when the former is in its upper operative position (illustrated in dot-dash line in FIG. 28), the latter is rearwardly retracted to its dotted line position. When the backup section 200 is in its forward operative solid line position, the section 186 is in its lowered, solid line position, in which truck tow pins 22 are freed from driving engagement by the branch conveyor dogs 42.

The backup rail 200 for the shock absorber stop dog 197 is held in its operative, solid line position of FIGS. 26 and 28 by means of a small vertically pivoted latch arm 207, with a small coil tension spring 208 urging the latch arm clockwise (FIG. 26) to maintain its latching engagement with the rail. Movement of the latch 207 in an opposite direction is effected upon tensioning of a flexible cable 209 connected thereto, in a manner to be described.

The reference numeral 210 designates a reset bell crank or lever pivoted at 210' and having a bent arm 211 which extends into the path of tow pin travel, i.e., per dotted line in FIG. 26. A further arm 212 of this bell crank has a pivotal operating connection at its free end 213 to the lever or arm 201 which carries backup rail section 200.

A coil spring 214 encircles an elongated rod 215 fixed to and extending forwardly of the carriage 194 which mounts the stop dog 197. The rod is slidably guided in a fixed bracket 216, and a spring 214 acts between this bracket and the carriage 194 to return the latter from the extended dotted line position, to which the stop lug 199 is forced in halting the tow pin 22, to the normal solid line position. This represents a throw of about three inches. Spring 214 is of only sufficient strength to restore the shock absorber dog 197 rearwardly, as described.

In operation, with the shock absorber backup rail 200 held by the latch 207 in the operative, solid line position of FIGS. 26 and 28, the opposite dog release and reset section 186 is dropped down to its solid line position of FIG. 28. As advancing tow pin 22 strikes the stop lug 199, the shock absorber is extended and halts the tow pin gently, with its dog 197 in the dotted line position of FIG. 26. The branch conveyor dog 42 drops back to the position of FIG. 26, being unsustained by track section 186.

The associated truck 122 remains in this position until the flexible cable 209 is tensioned, which may be effected through the agency of a unit 218 located forwardly of unit 149 and similar to the unit 39, its operating arm 219 being actuated by a track tow pin preceding the tow pin halted by the unit 149 shown. It is within the contemplation of the invention that trucks may be successively halted and accumulated along the branch track 13 by successive units such as are shown in FIGS. 26–28, ultimately controlled by the cable 109 (FIG. 22) of an empty place spotter unit 40, in the same manner as described in reference to the first embodiment of the system.

In an installation involving either a single unit of the shock absorber type reset and release nature embodying units 148, 149, or characterized by a plurality of such combined units, it may be desirable to prevent switching of a truck onto the branch track so long as such combined units are occupied by a truck or trucks. For this purpose the invention provides a cable connection 209' (see FIG. 22) between the switch reset unit 39 and the combined unit 148—149 first beyond the same in the direction of travel of trucks along the branch track, which in a multiple installation would be the last of the said combined units. Through the agency of such connection 209', the switch reset unit 39 is caused to prevent the latch 150 from taking a position to hold the switch tongue 147 in the diverting position. As a consequence, so long as the accumulation stations along the branch track are occupied, all trucks will travel undiverted past switch tongue 147 along the main conveyor floor slot 25.

Upon receipt of a signal from the empty place spotter, indicating the approach of an unoccupied main conveyor trolley, the flexible cable 209 is tensioned under the control of a unit such as is shown in FIGS. 15–18. This unlatches the shock absorber backup rail 200, which falls back to the dotted line position of FIG. 28 as counterweight 189 simultaneously biases the release and reset rail section 186 (FIG. 28) upwardly to the dotted line position. The next arriving branch conveyor dog 42, now laterally sustained, picks up the tow pin 22 and advances the truck. As this happens the shock absorber dog 197 is crowded out of the way, being laterally unsustained, to allow the truck to pass. Upon engaging the reset arm 211 in its resumed travel, the tow pin swings the latter to the solid line position of FIG. 26, causing the bell crank arm 212 to reset the backup track 200 to its original operative position, in which it is automatically held by latch 207.

Mention has been made of the fact that the reset signal unit or station 39 employed in the system of FIG. 22 resembles the cable pull unit of FIGS. 12, 13 and 14. It has also been pointed out that the reset unit 39 may function conjointly with the units 148, 149 in preventing the latch 150 from taking a position to hold the switch tongue 147 in its diverting position. In an installation of this charatcer, for the purpose of latching the latch 150 itself in the desired position to release switch tongue 147, the reset unit 39 will be provided with means such as are shown in my earlier Patent No. 2,949,862, of August 23, 1960 (FIG. 10) to maintain the cable 185 tensioned after the roller 95 of unit 39 has been tripped by a truck tow pin 22.

*Operation*

Since the operation of the individual basic components of the improved sub-floor conveyor system, in both embodiments thereof, has been explained in the description of the structural features thereof, as well as their operational effect on one another, it is believed necessary only to sketch out the operation of the systems as a whole, in a brief way.

In reference to the system of FIG. 1, assuming that the trucks 122 have been adjusted as to the settings of their respective depending comb teeth or tappets 178 to cause the trucks to be switched onto the branch track reach 13, the tow pin 22 of the truck will engage and trip the sub-floor lever 155 (FIGS. 23–25), swinging it from the solid to the dotted line position of FIG. 23. This causes the cammed elevation of the sub-floor comb extension 173 above the floor, where it is next engaged by the truck-borne tappet 178. The cable 146 is tensioned, latch arm 56 is disengaged from the pull-out lever 50, and the latter swings clockwise from its solid to its dotted line position of FIG. 5.

The truck which initiated the signal now comes into engagement with the pull-out lever 50 and swings it counterclockwise (FIG. 5) from the dotted toward the solid line position, during which movement the hook arm 59 pulls the tow pin 22 into the connecting arcuate floor slot 23. As the pin traverses this slot the hook arm 59 is is cammed away from in front of it, whereupon the tow pin 22 comes under the control of a dog 42 on the branch conveyor chain 30.

It is forwarded by this dog to the truck release and reset station 38, the backing rail 70 of which is at this time latched in its depressed position, shown in solid line in FIG. 11. Here, since lateral support of the chain dog is lacking the dog falls away from the tow pin, and the motion of the truck comes to a halt. Halting may be assisted by the provision of suitable frictional snubbing or like restraining means at the truck release mechanism 38, and, if desired, an automatic anti-shock accumulator unit like the unit 149 of FIG. 22 may also be employed in high speed or heavy load work handling.

The release mechanism 38 is conditioned as described by the cable pull unit 83 of the reset unit 39 in advance of the mechanism 38. Setting is under mechanical control of the tow pin 22 in question, as it engages and swings the operating arm 91 of the cable pull unit 93.

The empty place spotter 40 signals the unit 38 for the return of a halted branch track truck onto the main conveyor reach 12 when, and only when, a main conveyor trolley 15, which trips the cable pull unit 105 of the empty place spotter, is also unoccupied by a truck tow pin 22. This causes cable 85 to unlatch the pivoted backup rail 70, for branch conveyor dogs 42, which is then counterweighted upwardly to position to back up the dogs. The branch track truck in question is forwarded by the next advancing dog 42.

In the event the signaling main conveyor trolley 15 is occupied by a tow pin, the actuation of the cable pull unit 102 has the effect of disabling the actuation of cable 85, by affording a lost motion between the same and the tripped cable pull unit 105, so that the backup rail 70 remains latched in depressed position.

As advanced by the dog 42, the returned truck 122 passes onto the main conveyor return reach 12 where it is picked up by the signaling trolley 15 and continues along the main conveyor path.

The apparatus is simple, rugged and inexpensive as to its parts. All controls are operated mechanically and under motivation by the trucks 122 alone. The need for accurate synchronization of conveyors is avoided. As indicated, the system is extremely versatile in regard to its possible installations, and standard forms may be employed in numerous different installations, each necessarily more or less custom designed as to the placement of its components.

In reference to the overall operation of the system of FIG. 22, the actuation of the signal unit 128 by an approaching truck which has its signal control unit 127 appropriately set is the same as in the first form, but the switch tongue 147 operated by the tripping is structurally simpler than the pull out arrangement of FIGS. 1 through 5. Cable 146 swings the tongue counterclockwise (FIG. 22) and it is held in this setting by the spring biased latch 150. The truck 122 which caused the signal passes into the arcuate connecting floor slot 23, then trips the signal unit 39, by engaging its sub-floor roller 95. This releases the latch 150 and causes tongue 147 to be spring-restored to its original position.

Assuming that the anti-shock truck accumulator and release unit 149 has its backing rail 200 (FIGS. 26–28) for the shock absorber dog 197 in operative position to laterally sustain that dog, the oncoming truck tow pin 22 strikes the laterally projecting dog lug 199, and the shock absorber is extended to the dotted line position of FIG. 26 as it gently but firmly brings the truck to rest. As this occurs the backup rail or track section 186 for the branch conveyor dogs 42 is in its downwardly retracted, solid line position of FIG. 28.

As a previous truck on the branch track is released by empty place spotter 40 and trips the signal station 218, the flexible pull cable 209 of the latter releases the rail holding latch 207, whereupon shock absorber backup rail 200 now retracts to the dotted line position of FIG. 28, under the force of counterweight 189, as the conveyor dog backup rail 186 simultaneously comes into sustaining position. The next branch conveyor dog 42 then picks up the truck tow pin 22 and the latter, in advancing, actuates reset arm 211 to restore rail 200 to its previous effective position.

The main line conveyor station or unit 128 of FIG. 22 and the branch line control means comprised of devices 39, 148 and 149 are operable independently of one another in so far as the switch 147 of FIG. 22 is concerned to determine whether or not a load carrying truck or member shall be diverted by the switch to the branch track.

The operation of the empty place spotter 40 has been adequately described. It is operatively connected by its flexible cable 109 to the forward-most signaling station 218 on the branch track 13, thus to condition a truck halted at that station to be picked up and advanced by the next oncoming branch conveyor dog 42, once an unburdened trolley 15 on the main track reach has properly tripped unit 40.

The signaling and switching provisions for diverting the trucks onto the branch track, per FIGURES 1 and 22, respectively, are mechanically operated in their entirety and operate very reliably. Structurally speaking, the embodiment of FIGURE 22 is the simpler. However, that of FIGURE 1 has the advantage of diminishing shock on the truck tow pins in the transfer, by cradling the pins and gradually drawing the same laterally during the advance of the truck. This minimizes wear and tear on the tow pins in the switching operation.

What I claim as my invention is:

1. A control mechanism for a conveyor system, including a conveyor operating generally parallel with a track to forward load members therealong, said conveyor having longitudinally spaced dogs engageable with load members to forward the same, said mechanism controlling the stoppage of said load members on said track by operatively disconnecting the same from a conveyor dog, said control mechanism comprising a resiliently operating shock-absorber unit and a release and reset unit, both adjacent said track, said shock-absorber unit having a dog engageable with a load member to yieldingly halt the same and said release and reset unit acting to disengage said load member from its conveyor dog as said load member is thus halted, and means connecting said units for synchronized operation.

2. A control unit in accordance with claim 1, in which said shock-absorber and release and reset units are each provided with a backup member adjustable between operative and inoperative positions in which the former unit presents its dog for halting engagement with a load member and the latter acts to disengage the load member from the conveyor dog, and vice versa.

3. A control mechanism for a conveyor system, including first and second tracks communicating at an angle with one another and a conveyor operating generally parallel with said first track to forward load members therealong, said conveyor having longitudinally spaced dogs engageable with load members to forward the same, said mechanism controlling the stoppage of said load members on said first track, by operatively disconnecting the same from a conveyor dog, and the transfer of said load member to the second track, said control mechanism comprising a resiliently operating shock-absorber unit and a release and reset unit, both adjacent said first track, said shock-absorber unit having a dog engageable with a load member to yieldingly halt the same and said release and reset unit acting to disengage said load member from its conveyor dog as said load member is thus halted, means connecting said units for synchronized operation, and means controlling the operation of said units, comprising a signal station adjacent said second track which is operatively connected to one of said units and is controlled in its operation in response to the presence or absence of a load member advancing along said second track.

4. A control unit in accordance with claim 3, in which said shock-absorber and release and reset units are each provided with a backup member adjustable between operative and inoperative positions in which the former unit presents its dog for halting engagement with a load member and the latter acts to disengage the load member from the conveyor dog, and vice versa.

5. A control unit in accordance with claim 3 in which said shock-absorber and release and reset units are each provided with a backup member adjustable between operative and inoperative positions in which the former unit presents its dog for halting engagement with a load member and the latter acts to disengage the load member from the conveyor dog, and vice versa, said signal station being operatively connected by mechanical means with the backup member of one of said units.

6. A conveyor system comprising means defining conveyor tracks communicating angularly with one another at a switching zone, endless conveyors traveling continuously in non-meeting but close side-by-side spaced and generally parallel adjacency to one another at said switching zone, said conveyors being generally parallel to said respective tracks, said conveyors following laterally angled paths adjacent said switching zone, mobile load bearing units each having a tow element projecting vertically in relation to said respective tracks and a control device adjustable thereon, said respective conveyors each being provided with a plurality of longitudinally spaced driving dogs traveling non-meeting paths and being engageable with said tow elements, and switching means to selectively disenage a tow element from a dog of one conveyor by shifting said low element across said dog and transversely relative to said conveyor paths out of the path of said one conveyor and into the path of the dogs of the other conveyor, for engagement of said element by a dog of said other conveyor traveling the path of the latter; thereby to laterally move a load bearing unit across said switching zone and from one of said communicating tracks to the other, said means comprising a member to effect said selective disengagement, a selective signal unit positioned adjacent said one track in advance of said zone and engageable and controllable by the adjustable control device of a load bearing unit, and means operatively connecting said signal unit with said member to effect said selective disengagement.

7. A conveyor system comprising means defining conveyor tracks communicating angularly with one another at a switching zone, endless conveyors traveling continuously in non-meeting but close side-by-side spaced and generally parallel adjacency to one another at said switching zone, said conveyors being generally parallel to said respective tracks and in vertically spaced relation thereto, said conveyors following laterally angled paths adjacent said switching zone, mobile load bearing units each haivng a tow element depending vertically in relation to said respective tracks and a control device adjustable thereon, said respective conveyors each being provided with a plurality of longitudinally spaced driving dogs traveling non-meeting paths and being engageable with said tow elements, and switching means to selectively disengage a tow element from a dog of one conveyor by shifting said tow element across said dog and transversely relative to said conveyor paths out of the path of said one conveyor and into the path of the dogs of the other conveyor, for engagement of said element by a dog of said other conveyor traveling the path of the latter; thereby to laterally move a load bearing unit across said switching zone and from one of said communicating tracks to the other, said means comprising a member to effect said selective disengagement, a selective signal unit positioned adjacent said one track in advance of said zone and engageable and controllable by the adjustable control device of a load bearing unit, and means operatively connecting said signal unit with said member to effect said selective disengagement.

8. A conveyor system comprising means defining conveyor tracks communicating angularly with one another at a switching zone, endless conveyors traveling continuously in non-meeting but close side-by-side spaced and generally parallel adjacency to one another at said switching zone, said conveyors being generally parallel to said respective tracks, said conveyors following laterally angled paths adjacent said switching zone, mobile load bearing units each having a tow element projecting vertically in relation to said respective tracks and a control device adjustable thereon, said respective conveyors each being provided with a plurality of longitudinally spaced driving dogs traveling non-meeting paths and being engageable with said tow elements, and switching means to selectively disengage a tow element from a dog of one conveyor by shifting said tow element across said dog and transversely relative to said conveyor paths out of the path of said one conveyor and into the path of the dogs of the other conveyor, for engagement of said element by a dog of said other conveyor traveling the path of the latter; thereby to laterally move a load bearing unit across said switching zone and from one of said communicating tracks to the other, said means comprising a selective signal unit positioned adjacent said one track in advance of said zone and engageable and controllable by the adjustable control device of a load bearing unit, and a switching member movably mounted adjacent said switching zone and mechanically connected to and controlled by said selective signal unit, as the latter is controlled by said control device to take an operative position for engagement with a tow element to divert it into the path of said other conveyor, for engagement and movement by a dog thereof.

9. A conveyor system comprising means defining conveyor tracks communicating angularly with one another at a switching zone, endless conveyors traveling continuously in non-meeting but close side-by-side spaced and generally parallel adjacency to one another at said switching zone, said conveyors being generally parallel to said respective tracks, said conveyors following laterally angled paths adjacent said switching zone, mobile load bearing units each having a tow element projecting vertically in relation to said respective tracks and a control device adjustable thereon, said respective conveyors each being provided with a plurality of longitudinally spaced driving dogs traveling non-meeting paths and being engageable with said tow elements, and switching means to selectively disengage a tow element from a dog of one conveyor by shifting said tow element across said dog and transversely relative to said conveyor paths out of the path of said one conveyor and into the path of the dogs of the other conveyor, for engagement of said element by a dog of said other conveyor traveling the path of the latter; thereby to laterally move a load bearing unit across said switching zone and from one of said communicating tracks to the other, said means comprising a selective signal unit positioned adjacent said one track in advance of said zone and engageable and controllable by the adjustable control device of a load bearing unit, a switching member movably mounted adjacent said switching zone and mechanically connected to and controlled by said selective signal unit, as the latter is controlled by said control device, to take an operative position for engagement with a tow element to divert it into the path of said other conveyor, for engagement and movement by a dog thereof, and means operatively connected to said switching member and acting mechanically after such diversion and in response to engagement by a diverted tow element to place said switching member in a retracted, inoperative position pending further control operation of said switching member by said signal unit.

10. A conveyor system comprising means defining conveyor tracks communicating angularly with one another at a switching zone, endless conveyors traveling continuously in non-meeting but close side-by-side spaced and generally parallel adjacency to one another at said switching zone, said conveyors being generally parallel to said respective tracks, said conveyors following laterally angled paths adjacent said switching zone, mobile load bearing units each having a tow element projecting vertically in relation to said respective tracks and a control device adjustable thereon, said respective conveyors each being provided with a plurality of longitudinally spaced driving dogs traveling non-meeting paths and being engageable with said tow elements, and switching means to selectively disengage a tow element from a dog of one conveyor by shifting said tow element across said dog and transversely relative to said conveyor paths out of the path of said one conveyor and into the path of the dogs of the other conveyor, for engagement of said element by a dog of said other conveyor traveling the path of the latter; thereby to laterally move a load bearing unit across said switching zone and from one of said communicating tracks to the other, said means comprising a selective signal unit positioned adjacent said one track in advance of said zone and engageable and controllable by the adjustable control device of a load bearing unit, a switching member movably mounted adjacent said switching zone and mechanically connected to and controlled by said selective signal unit, as the latter is controlled by said control device, to take an operative position for engagement with a tow element to divert it into the path of said other conveyor, for engagement and movement by a dog thereof, and means operatively connected to said switching member and acting mechanically after such diversion and in response to engagement by a diverted tow element to place said switching member in a retracted, inoperative position pending further control operation of said switching member by said signal unit, said last named means comprising a reset device positioned to the rear of said switching zone and mechanically connected to said switching member, said reset device being operable by said tow element following said diversion to restore said switching member to said inoperative position.

11. A conveyor system in accordance with claim 8, in which said load bearing units are wheeled trucks to traverse a floor and said conveyors and switching member are mounted beneath said floor for engagement by said tow elements, said switching member being pivotally mounted and in the general form of a hook exerting positive lateral shifting action on the tow element in swinging to divert the latter.

12. A conveyor system in accordance with claim 10, in which said load bearing units are wheeled trucks to traverse a floor and said conveyors and switching member are mounted beneath said floor for engagement by said tow elements, said switching member being pivotally mounted and in the general form of a hook exerting positive lateral shifting action on the tow element in swinging to divert the latter, said last named means comprising a latch engaging and holding said switching member in its inoperative position.

13. A conveyor system in accordance with claim 8, in which said load bearing units are wheeled trucks to traverse a floor and said conveyors and switching member are mounted beneath said floor for engagement by said tow elements, said switching member being pivotally mounted and being cammingly engaged by the tow element in diverting the latter.

14. In a conveyor of the class described, means defining a main conveyor path, a main powered conveyor having dogs engageable with mobile load members to forward the same along said main conveyor path, means providing a branch track in communication at an angle with said main path, a transfer conveyor to advance load members along said branch track, said transfer conveyor having movable dogs thereon for driving engagement with a load member to so advance the same, a first control mechanism including means adjacent said main path engageable by and operable on a load member traversing the same to divert said load member onto said branch track and into the path of a transfer conveyor dog, a release and reset mechanism adjacent said branch track engageable and operable by a load member traversing the same to cause individual movement of said transfer conveyor dogs out of position for driving engagement with a load member, and a second control mechanism operatively connected to said release and reset mechanism to cause the latter to restore said branch conveyor dogs to position for driving engagement with a load member.

15. In conveyor of the class described, means defining a main conveyor path, a main powered conveyor having dogs engageable with mobile load members to forward the same along said main conveyor path, means providing a branch track in communication at an angle with said main path, a transfer conveyor to advance load members along said branch track, said transfer conveyor having movable dogs thereon individually movable thereto, and means to normally hold said dogs in position for driving engagement with a load member to so advance the same, a first control mechanism including means adjacent main path engageable by and operable on a load member traversing the same to divert said load member laterally from said main path onto said branch track and into the path of a transfer conveyor dog, a release and reset mechanism adjacent said branch track engageable and operable by a load member traversing the same to cause individual movement of said transfer conveyor dogs out of position for driving engagement with a load member, and a second control mechanism operatively connected to said release and reset mechanism to cause the latter to restore said branch conveyor dogs to position for driving engagement with a load member.

16. A conveyor in accordance with claim 15, in which said first control mechanism further comprises a pivoted control arm swingably actuated by said main conveyor dog, a diverting arm pivoted on said control arm and engageable with said load member to divert the same into said branch track, and a fixed cam engageable with said diverting arm in the swinging of said control arm to withdraw the diverting arm from said diverting engagement.

17. In a conveyor as described in claim 15, the further improvement in which said second control mechanism is positioned adjacent said main path being engageable and actuated by a dog of said main conveyor and operatively connected to said release and reset mechanism to restore said branch conveyor dogs to position for driving engagement with a load member.

18. A conveyor in accordance with claim 16, and further comprising a latch normally holding said control arm out of operative position for engagement by said main conveyor, and gravity responsive means operatively connected to said arm to swing the same to said operative position upon release of said latch.

19. A conveyor system comprising means defining conveyor tracks communicating angularly with one another at a switching zone, endless conveyors traveling in non-meeting but close side-by-side spaced and generally parallel adjacency to one another at said switching zone, said conveyors being generally parallel to said respective tracks, said conveyors following laterally angled paths adjacent said switching zone, mobile load bearing units each having a propelling element and a control device adjustable thereon, said respective conveyors each being provided with a plurality of longitudinally spaced driving dogs traveling non-meeting paths and being engageable with said propelling elements, and switching means to selectively disengage a propelling element from a dog of one conveyor by shifting said propelling element across said dog and transversely relative to said conveyor paths out of the path of said one conveyor and into the path of the dogs of the other conveyor, for engagement of said element by a dog of said other conveyor traveling the path of the latter; thereby to laterally move a load bearing unit across said switching zone and from one of said communicating tracks to the other, said means comprising a selective signal unit positioned adjacent said one track in advance of said zone and engageable and controllable by the adjustable control device of a load bearing unit to effect said selective disengagement.

20. A conveyor system in accordance with claim 19, in which said last named means further comprises a movable member engageable by the propelling elements of said load bearing units in so shifting the same, and means controlled by said selective signal unit to releasably latch said last named member in one of two positions of the latter, in one of which said last named member is so engaged by a propelling element in so shifting the latter.

21. A conveyor in accordance with claim 14, in which said release and reset member comprises shock absorber means engageable by a load member traversing said branch track to provide a cushioned halt of the load member at said release and reset mechanism.

22. In a conveyor of the class described, means defining a main conveyor path, a main powered conveyor having dogs engageable with mobile load members to forward the same along said main conveyor path, means providing a branch track in communication at an angle with said main path, a transfer conveyor to advance load members along said branch track, said transfer conveyor having movable dogs thereon for driving engagement with a load member to so advance the same, a first control mechanism including means adjacent said main path engageable and operable by a load member traversing the same to divert said load member onto said branch track and into the path of a transfer conveyor dog, a release and reset mechanism adjacent said branch track engageable and operable by a load member traversing the same to cause individual movement of said transfer conveyor dogs out of position for driving engagement with a load member, means operatively connected to said release and reset mechanism and to said first control mechanism and actuable by diverted load members under the control of said release and reset mechanism to prevent operation of said first control mechanism to divert a following load member, and a second control mechanism operatively connected to said release and reset mechanism to restore said branch conveyor dogs to position for driving engagement with a load member.

23. In a conveyor of the class described, means defining a main conveyor path, a main powered conveyor having dogs engageable with mobile load members to forward the same along said main conveyor path, means providing a branch track in communication at an angle with said main path, a transfer conveyor to advance load members along said branch track, said transfer conveyor having movable dogs thereon for driving engagement with a load member to so advance the same, a first control mechanism including means adjacent said main path engageable and operable by a load member traversing the same to divert said load member onto said branch track and into the path of a transfer conveyor dog, a release and reset mechanism adjacent said branch track engageable and operable by a load member traversing the same to cause individual movement of said transfer conveyor dogs out of position for driving engagement with a load member, means operatively connected to said release and reset mechanism and to said first control mechanism and actuable by diverted load members under the control of said release and reset mechanism to prevent operation of said first control mechanism to divert a following load member, and a second control mechanism operatively connected to said reelase and reset mechanism to restore said branch conveyor dogs to position for driving engagement with a load member, said release and reset mechanism comprising shock absorber means engageable by a load member traversing said branch track to provide a cushioned halt of the load member at said release and reset mechanism.

24. In a conveyor of the class described, means defining a main conveyor path, a main powered conveyor having dogs engageable with mobile load members to forward the same along said main conveyor path, means providing a branch track in communication at an angle with said main path, a transfer conveyor to advance having movable dogs thereon for driving engagement with a load member to so advance the same, a first control mechanism including movable means adjacent said main path engageable by and operable on a load member traversing the same to divert said load member onto said branch track and into the path of a transfer conveyor dog, a release and reset mechanism adjacent said branch track engageable and operable by a load member traversing the same to cause individual movement of said trasfer conveyor dogs out of position for driving engagement with a load member, a second control mechanism operatively connected to said release and reset mechanism to cause the latter to restore said branch conveyor dogs to position for driving engagement with a load member, and signal means positioned adjacent said main path for operation by a load member approaching said first control mechanism, said signal means having means operatively connecting the same with said means of said first control mechanism to control the operation of said last named means.

25. In a conveyor of the class described,
   (a) means providing a main conveyor track along which mobile load carrying members are forwarded,
   (b) means providing a branch track adjacent and at an angle to said main track along which said load carrying members are adapted to be diverted from the main track,
   (c) a first control device including a switch adjacent said main and branch tracks engageable by and operable on load carrying members forwarded along said first track to divert such load carrying members to said branch track,
   (d) a further control device adjacent said main track adapted to be operated by a load carrying member approaching said switch along the main track,
   (e) a signal unit adjacent said branch track adapted to be operated by a load carrying member which has entered said branch track from said switch, and
   (f) means independently and operatively connecting said signal unit with one of said control devices to the exclusion of the other control device to determine whether or not a following load carrying member on said main track is to be diverted by said switch to said branch track.

References Cited in the file of this patent

UNITED STATES PATENTS

| | | |
|---|---|---|
| 795,124 | Hetzel | July 18, 1905 |
| 1,124,271 | Bernheim | Jan. 12, 1915 |
| 1,297,680 | Hanak | Mar. 18, 1919 |
| 1,781,424 | Anderson | Nov. 11, 1930 |
| 1,947,354 | Mullen | Feb. 13, 1934 |
| 2,201,013 | Rosenthal | May 14, 1940 |
| 2,576,178 | Hiles | Nov. 27, 1951 |
| 2,619,370 | Leger | Nov. 25, 1952 |
| 2,619,916 | Rainiier | Dec. 2, 1952 |
| 2,635,555 | Hansson | Apr. 21, 1953 |
| 2,660,127 | Boyko et al. | Nov. 24, 1953 |
| 2,688,936 | Brooks | Sept. 14, 1954 |
| 2,714,860 | Branham | Aug. 9, 1955 |
| 2,737,902 | Folsom | Mar. 13, 1956 |
| 2,816,516 | Diehl | Dec. 17, 1957 |
| 2,853,955 | Bishop et al. | Sept. 30, 1958 |
| 2,868,139 | Klamp | Jan. 13, 1959 |

FOREIGN PATENTS

| | | |
|---|---|---|
| 198,720 | Germany | May 23, 1908 |